US012672193B2

(12) United States Patent     (10) Patent No.:   US 12,672,193 B2

Zhou et al.            (45) Date of Patent:      Jun. 30, 2026

(54) UNIFIED TRANSMISSION CONFIGURATION INDICATION FOR NONDEDICATED CHANNELS

(71) Applicant: QUALCOMM Incorporated, San Diego, CA (US)

(72) Inventors: Yan Zhou, San Diego, CA (US); Fang Yuan, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 389 days.

(21) Appl. No.: 18/265,420

(22) PCT Filed: Feb. 5, 2021

(86) PCT No.: PCT/CN2021/075446

§ 371 (c)(1),
(2) Date: Jun. 5, 2023

(87) PCT Pub. No.: WO2022/165738

PCT Pub. Date: Aug. 11, 2022

(65) Prior Publication Data

US 2024/0032133 A1     Jan. 25, 2024

(51) Int. Cl.
*H04W 76/20*        (2018.01)
*H04B 7/06*        (2006.01)
         (Continued)

(52) U.S. Cl.
CPC ........ *H04W 76/20* (2018.02); *H04B 7/06968* (2023.05); *H04W 72/1268* (2013.01); *H04W 72/21* (2023.01)

(58) Field of Classification Search
CPC . H04W 76/20; H04W 72/1268; H04W 72/21; H04B 7/06968; H04L 5/0035; H04L 5/0053; H04L 5/0023
See application file for complete search history.

(56) References Cited

U.S. PATENT DOCUMENTS

2021/0007066 A1 * 1/2021 Lin ....................... H04L 1/0061
2021/0058906 A1 * 2/2021 Seo ...................... H04B 7/0617
         (Continued)

FOREIGN PATENT DOCUMENTS

CN     111010890 B   *   7/2022     ......... H04W 72/53
CN     114071776 B   *   8/2024    ........ H04W 74/0833
         (Continued)

OTHER PUBLICATIONS

International Search Report and Written Opinion—PCT/CN2021/075446—ISA/EPO—Sep. 6, 2021.
         (Continued)

*Primary Examiner* — Kevin T Bates
*Assistant Examiner* — Poonam Sharma
(74) *Attorney, Agent, or Firm* — Holland & Hart LLP /Qualcomm

(57) ABSTRACT

Aspects presented herein may enable a UE to determine QCL information and/or a spatial filter for non-dedicated channel and/or signal based on a unified TCI indication from a base station. In one aspect, a UE receives a TCI state indication in association with a communication of at least one non-dedicated DL channel or non-dedicated DL signal. The UE determines QCL information for the communication of the at least one non-dedicated DL channel or the non-dedicated DL signal based on one or more source reference signals for the received TCI state indication. The UE receives the at least one non-dedicated DL channel or the non-dedicated DL signal based on the received TCI state indication and the determined QCL information.

26 Claims, 13 Drawing Sheets

600

602

Receive a TCI state indication in association with a communication of at least one non-dedicated DL channel or non-dedicated DL signal

604

Determine QCL information for the communication of the at least one non-dedicated DL channel or the non-dedicated DL signal based on one or more source reference signals for the received TCI state indication

606

Receive the at least one non-dedicated DL channel or the non-dedicated DL signal based on the received TCI state indication and the determined QCL information

(51) Int. Cl.
    *H04W 72/1268*     (2023.01)
    *H04W 72/21*     (2023.01)

(56)           References Cited

U.S. PATENT DOCUMENTS

| | | | |
|---|---|---|---|
| 2021/0058971 A1 * | 2/2021 | MolavianJazi | ....... H04W 72/23 |
| 2022/0159417 A1 * | 5/2022 | Zhou | .................... H04W 72/23 |
| 2024/0430891 A1 * | 12/2024 | Park | ................... H04W 72/046 |

FOREIGN PATENT DOCUMENTS

| | | | | |
|---|---|---|---|---|
| EP | 3994835 B1 * | 11/2022 | ............ | H04W 72/23 |
| EP | 4209083 B1 * | 3/2025 | ........ | H04W 72/1268 |
| KR | 20200036725 A * | 4/2020 | ........ | H04W 72/1289 |
| WO | 2018232090 A1 | 12/2018 | | |
| WO | WO-2020033086 A1 * | 2/2020 | ........... | H04L 5/0048 |
| WO | 2021011442 A1 | 1/2021 | | |
| WO | WO-2022137305 A1 * | 6/2022 | ........... | H04L 1/1861 |

OTHER PUBLICATIONS

Partial International Search Report—PCT/CN2021/075446—ISA/ EPO—Jul. 9, 2021.

\* cited by examiner

Figure 4:
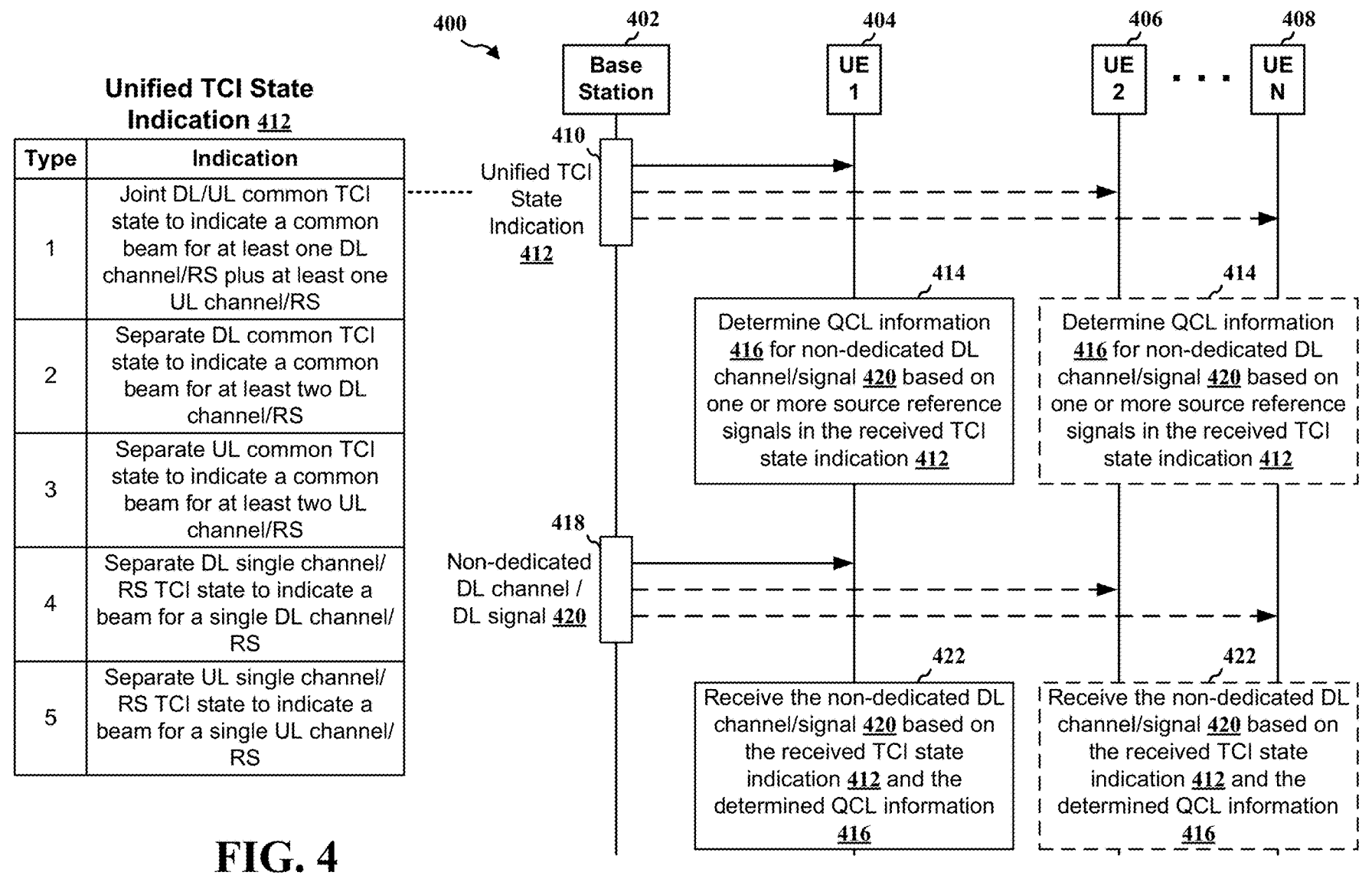

| Type | Indication |
|------|-----------|
| 1 | Joint DL/UL common TCI state to indicate a common beam for at least one DL channel/RS plus at least one UL channel/RS |
| 2 | Separate DL common TCI state to indicate a common beam for at least two DL channel/RS |
| 3 | Separate UL common TCI state to indicate a common beam for at least two UL channel/RS |
| 4 | Separate DL single channel/RS TCI state to indicate a beam for a single DL channel/RS |
| 5 | Separate UL single channel/RS TCI state to indicate a beam for a single UL channel/RS |

Unified TCI State Indication 412

Base Station 402

UE 1 404

UE 2 406

UE N 408

410 — Unified TCI State Indication 412

414 — Determine QCL information 416 for non-dedicated DL channel/signal 420 based on one or more source reference signals in the received TCI state indication 412

418 — Non-dedicated DL channel / DL signal 420

422 — Receive the non-dedicated DL channel/signal 420 based on the received TCI state indication 412 and the determined QCL information 416

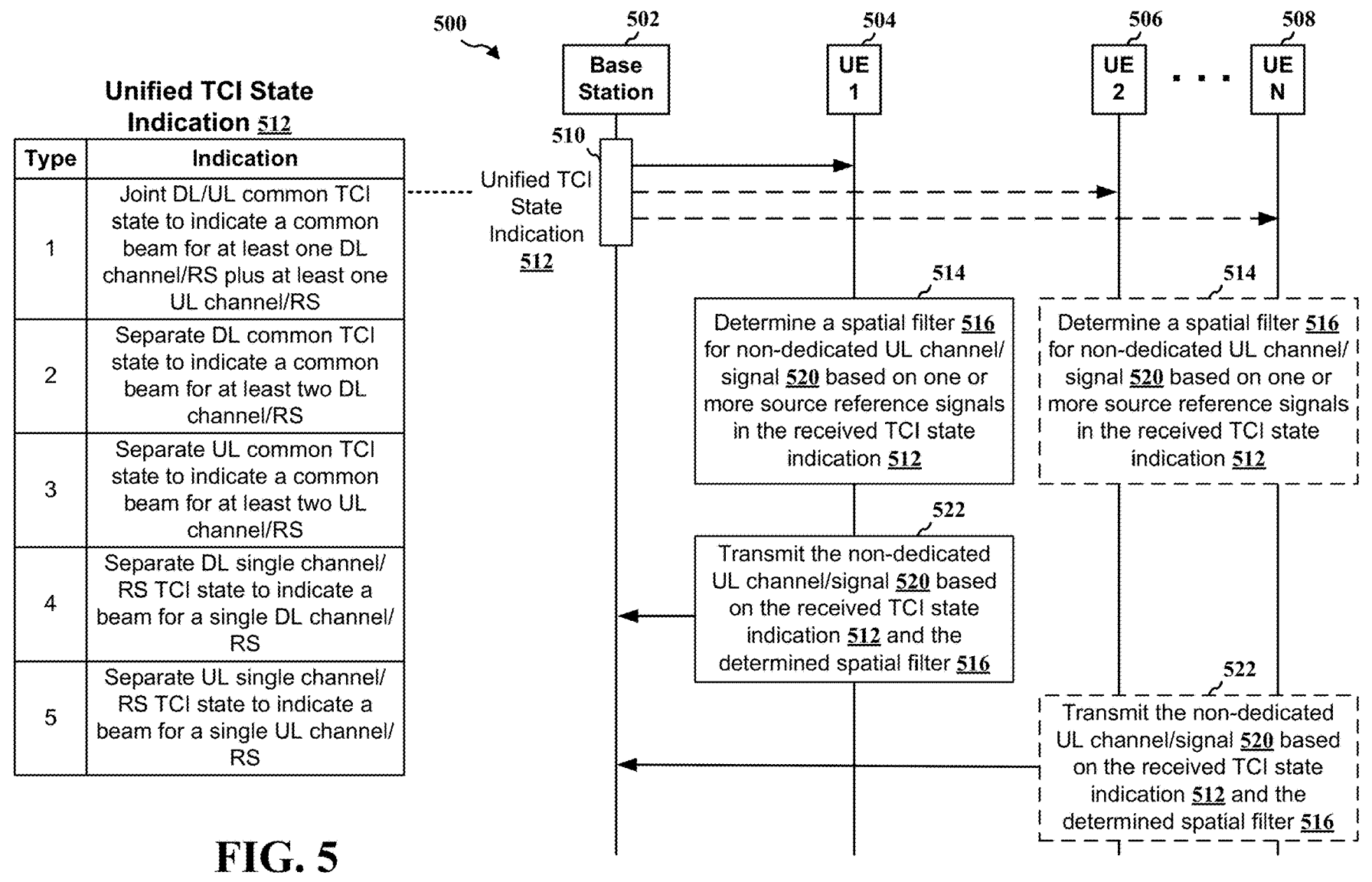

502 Base Station

510

Unified TCI State Indication 512

514 — Determine a spatial filter 516 for non-dedicated UL channel/signal 520 based on one or more source reference signals in the received TCI state indication 512

522 — Transmit the non-dedicated UL channel/signal 520 based on the received TCI state indication 512 and the determined spatial filter 516

514 — Determine a spatial filter 516 for non-dedicated UL channel/signal 520 based on one or more source reference signals in the received TCI state indication 512

522 — Transmit the non-dedicated UL channel/signal 520 based on the received TCI state indication 512 and the determined spatial filter 516

500

Unified TCI State Indication 512

| Type | Indication |
|------|------------|
| 1 | Joint DL/UL common TCI state to indicate a common beam for at least one DL channel/RS plus at least one UL channel/RS |
| 2 | Separate DL common TCI state to indicate a common beam for at least two DL channel/RS |
| 3 | Separate UL common TCI state to indicate a common beam for at least two UL channel/RS |
| 4 | Separate DL single channel/RS TCI state to indicate a beam for a single DL channel/RS |
| 5 | Separate UL single channel/RS TCI state to indicate a beam for a single UL channel/RS |

FIG. 5

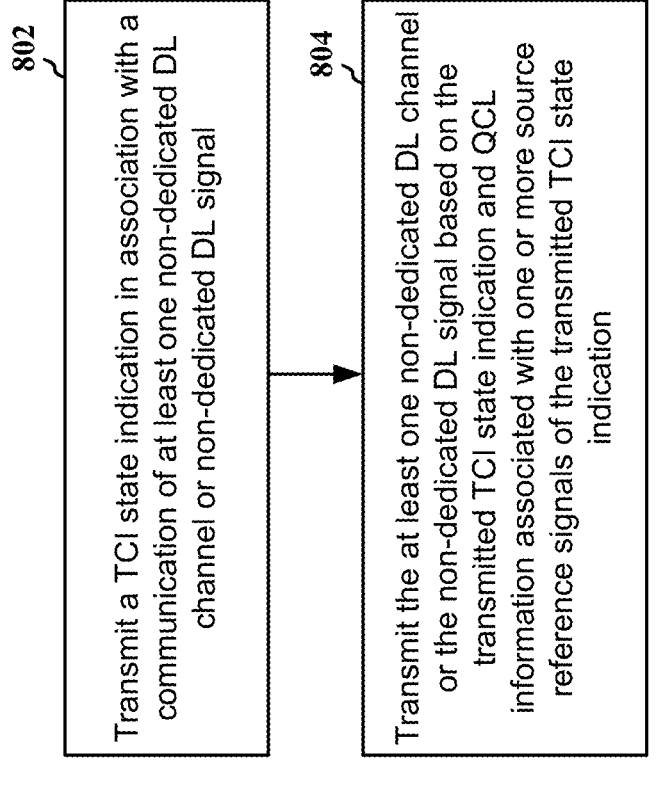

802

Transmit a TCI state indication in association with a communication of at least one non-dedicated DL channel or non-dedicated DL signal

804

Transmit the at least one non-dedicated DL channel or the non-dedicated DL signal based on the transmitted TCI state indication and QCL information associated with one or more source reference signals of the transmitted TCI state indication

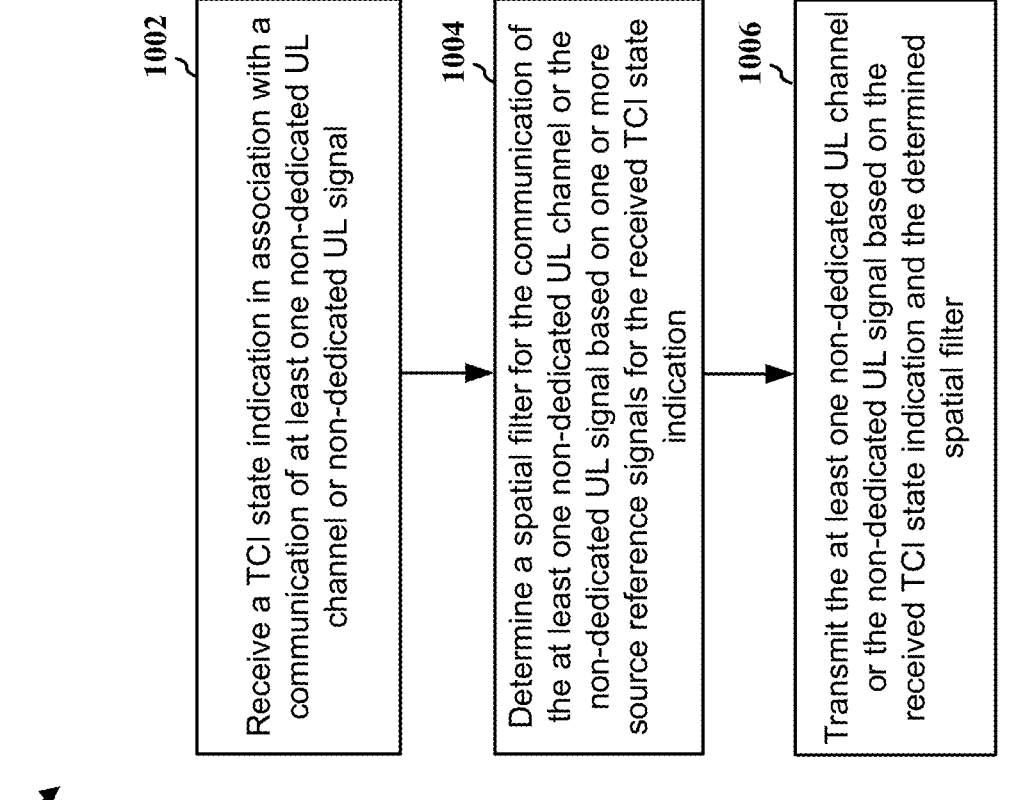

1000

1002

Receive a TCI state indication in association with a communication of at least one non-dedicated UL channel or non-dedicated UL signal

1004

Determine a spatial filter for the communication of the at least one non-dedicated UL channel or the non-dedicated UL signal based on one or more source reference signals for the received TCI state indication

1006

Transmit the at least one non-dedicated UL channel or the non-dedicated UL signal based on the received TCI state indication and the determined spatial filter

FIG. 10

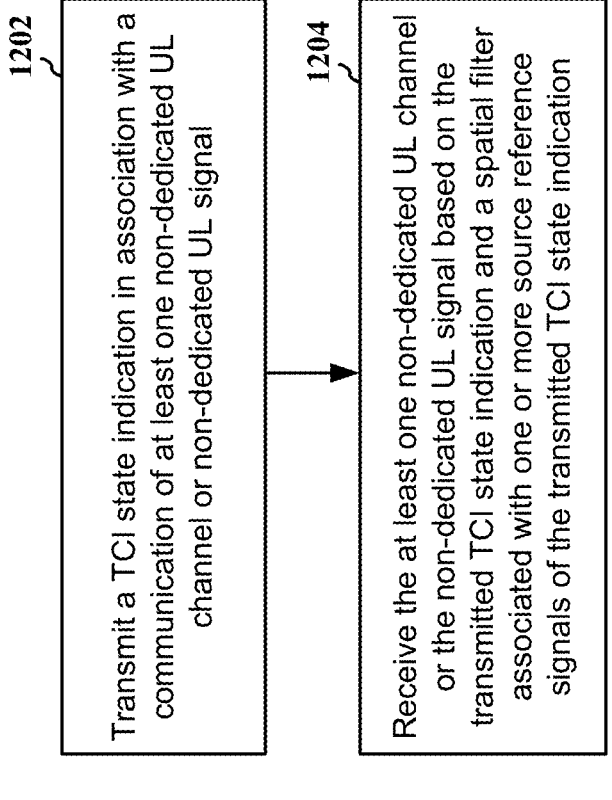

1200

1202

Transmit a TCI state indication in association with a communication of at least one non-dedicated UL channel or non-dedicated UL signal

1204

Receive the at least one non-dedicated UL channel or the non-dedicated UL signal based on the transmitted TCI state indication and a spatial filter associated with one or more source reference signals of the transmitted TCI state indication

FIG. 12

UNIFIED TRANSMISSION CONFIGURATION INDICATION FOR NONDEDICATED CHANNELS

CROSS REFERENCE TO RELATED APPLICATION(S)

This application is National Stage Application filed under 35 U.S.C. § 371 of PCT International Application Serial No. PCT/CN2021/075446 entitled "UNIFIED TRANSMIS-SION CONFIGURATION INDICATION FOR NONDEDI-CATED CHANNELS" and filed on Feb. 5, 2021, which is expressly incorporated by reference herein in its entirety.

TECHNICAL FIELD

The present disclosure relates generally to communica-tion systems, and more particularly, to wireless communi-cation involving transmission configuration indication (TCI).

INTRODUCTION

Wireless communication systems are widely deployed to provide various telecommunication services such as tele-phony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division mul-tiple access (FDMA) systems, orthogonal frequency divi-sion multiple access (OFDMA) systems, single-carrier fre-quency division multiple access (SC-FDMA) systems, and time division synchronous code division multiple access (TD-SCDMA) systems.

These multiple access technologies have been adopted in various telecommunication standards to provide a common protocol that enables different wireless devices to commu-nicate on a municipal, national, regional, and even global level. An example telecommunication standard is 5G New Radio (NR). 5G NR is part of a continuous mobile broad-band evolution promulgated by Third Generation Partner-ship Project (3GPP) to meet new requirements associated with latency, reliability, security, scalability (e.g., with Inter-net of Things (IoT)), and other requirements. 5G NR includes services associated with enhanced mobile broad-band (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication of a user equipment (UE). The apparatus receives a transmission configuration indication (TCI) state indication in association with a communication of at least one non-dedicated downlink (DL) channel or non-dedicated DL signal. The apparatus determines quasi co-location (QCL) information for the communication of the at least one non-dedicated DL channel or the non-dedicated DL signal based on one or more source reference signals for the received TCI state indication. The apparatus receives the at least one non-dedicated DL channel or the non-dedicated DL signal based on the received TCI state indication and the determined QCL information.

In an aspect of the disclosure, a method, a computer-readable medium, and an apparatus are provided for wireless communication of a base station. The apparatus transmits a TCI state indication in association with a communication of at least one non-dedicated DL channel or non-dedicated DL signal. The apparatus transmits the at least one non-dedi-cated DL channel or the non-dedicated DL signal based on the transmitted TCI state indication and QCL information associated with one or more source reference signals of the transmitted TCI state indication.

In an aspect of the disclosure, a method, a computer-readable medium, and an apparatus are provided for wireless communication of a UE. The apparatus receives a TCI state indication in association with a communication of at least one non-dedicated UL channel or non-dedicated uplink (UL) signal. The apparatus determines a spatial filter for the communication of the at least one non-dedicated UL channel or the non-dedicated UL signal based on one or more source reference signals for the received TCI state indication. The apparatus transmits the at least one non-dedicated UL chan-nel or the non-dedicated UL signal based on the received TCI state indication and the determined spatial filter.

In an aspect of the disclosure, a method, a computer-readable medium, and an apparatus are provided for wireless communication of a base station. The apparatus transmits a TCI state indication in association with a communication of at least one non-dedicated UL channel or non-dedicated UL signal. The apparatus receives the at least one non-dedicated UL channel or the non-dedicated UL signal based on the transmitted TCI state indication and a spatial filter associ-ated with one or more source reference signals of the transmitted TCI state indication.

In an aspect of the disclosure, a method, a computer-readable medium, and an apparatus are provided for wireless communication of a UE. The apparatus receives a TCI state indication in association with a communication of at least one non-dedicated channel or non-dedicated signal. The apparatus refrains from applying at least one of QCL infor-mation or a spatial filter for the communication of the at least one non-dedicated channel or the non-dedicated signal based on one or more source reference signals for the received TCI state indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is a communication flow illustrating an example of unified TCI state indication for non-dedicated DL channels and/or DL signals according to aspects of the present disclosure.

FIG. 5 is a communication flow illustrating an example of unified TCI state indication for non-dedicated UL channels and/or UL signals according to aspects of the present disclosure.

FIG. 8 is a flowchart of a method of wireless communication in accordance with aspects presented herein.

FIG. 10 is a flowchart of a method of wireless communication in accordance with aspects presented herein.

FIG. 12 is a flowchart of a method of wireless communication in accordance with aspects presented herein.

DETAILED DESCRIPTION

Figure 1:
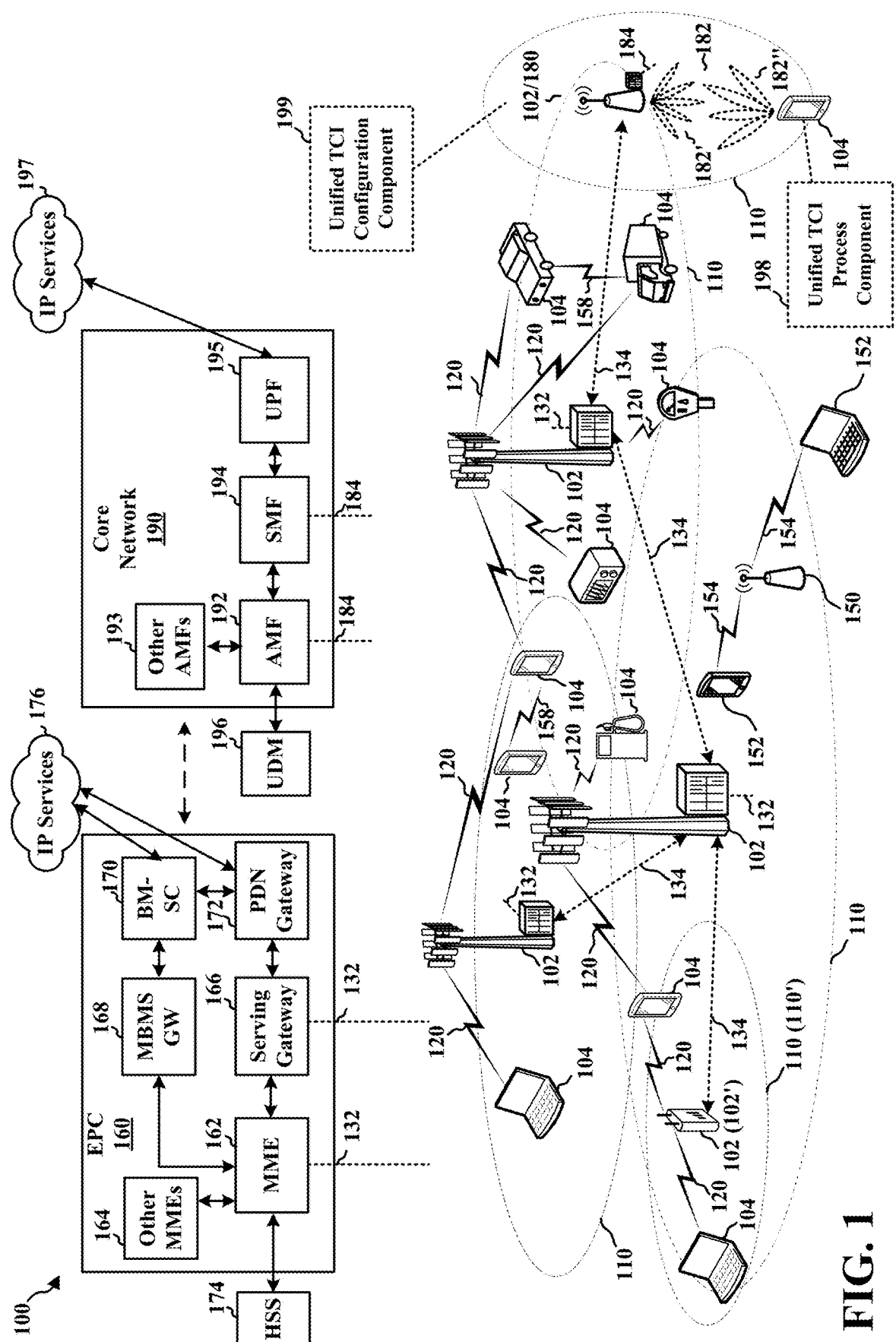
FIG. 1 is a diagram illustrating an example of a wireless communications system and an access network in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the base station 102/180 may include a unified TCI configuration component 199 configured to transmit unified TCI state indication for non-dedicated channel. In one configuration, the unified TCI configuration component 199 may be configured to transmit a TCI state indication in association with a communication of at least one non-dedicated DL channel or non-dedicated DL signal. In such a configuration, the unified TCI configuration component 199 may transmit the at least one non-dedicated DL channel or the non-dedicated DL signal based on the transmitted TCI state indication and QCL information associated with one or more source reference signals of the transmitted TCI state indication. In another configuration, the unified TCI configuration component 199 may be configured to transmit a TCI state indication in association with a communication of at least one non-dedicated UL channel or non-dedicated UL signal. In such a configuration, the unified TCI configuration component 199 may receive the at least one non-dedicated UL channel or the non-dedicated UL signal based on the transmitted TCI state indication and a spatial filter associated with one or more source reference signals of the transmitted TCI state indication.

In certain aspects, the UE 104 may include a unified TCI process component 198 configured to determine QCL information and/or a spatial filter for non-dedicated channel and/or signal based on a unified TCI indication. In one configuration, the unified TCI process component 198 may be configured to receive a TCI state indication in association with a communication of at least one non-dedicated DL channel or non-dedicated DL signal. In such a configuration, the unified TCI process component 198 may determine QCL information for the communication of the at least one non-dedicated DL channel or the non-dedicated DL signal based on one or more source reference signals for the received TCI state indication. In such a configuration, the unified TCI process component 198 may receive the at least one non-dedicated DL channel or the non-dedicated DL signal based on the received TCI state indication and the determined QCL information. In another configuration, the unified TCI process component 198 may be configured to receive a TCI state indication in association with a communication of at least one non-dedicated UL channel or non-dedicated UL signal. In such a configuration, the unified TCI process component 198 may determine a spatial filter for the communication of the at least one non-dedicate d UL channel or the non-dedicated UL signal based on one or more source reference signals for the received TCI state indication. In such a configuration, the unified TCI process component 198 may transmit the at least one non-dedicated UL channel or the non-dedicated UL signal based on the received TCI state indication and the determined spatial filter. In another configuration, the unified TCI process component 198 may be configured to receive a TCI state indication in association with a communication of at least one non-dedicated channel or non-dedicated signal. In such a configuration, the unified TCI process component 198 may refrain from applying at least one of QCL information or a spatial filter for the communication of the at least one non-dedicated channel or the non-dedicated signal based on one or more source reference signals for the received TCI state indication.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (IMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC

160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figures 2A, 2B, 2C, 2D:
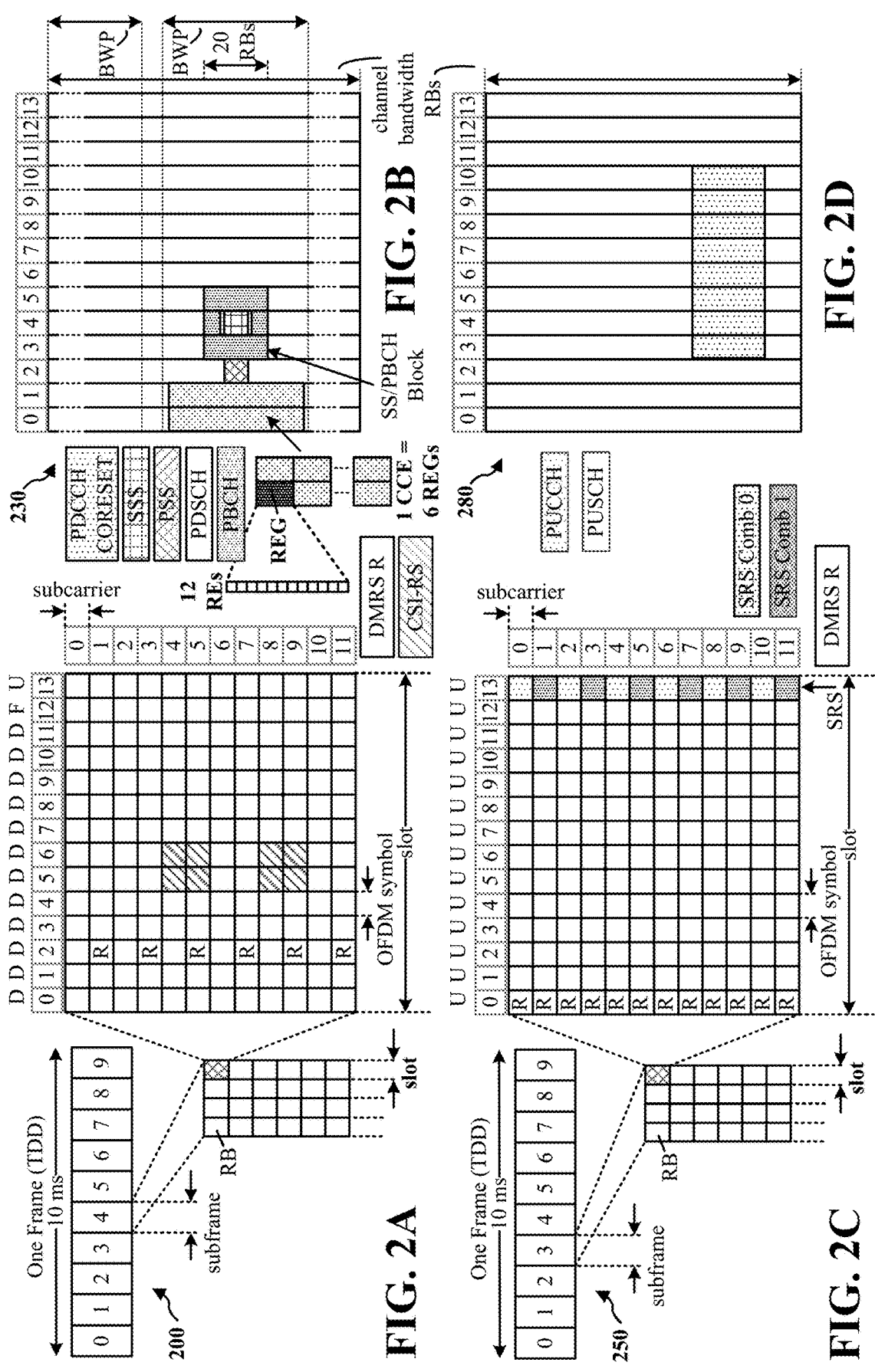
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where y is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
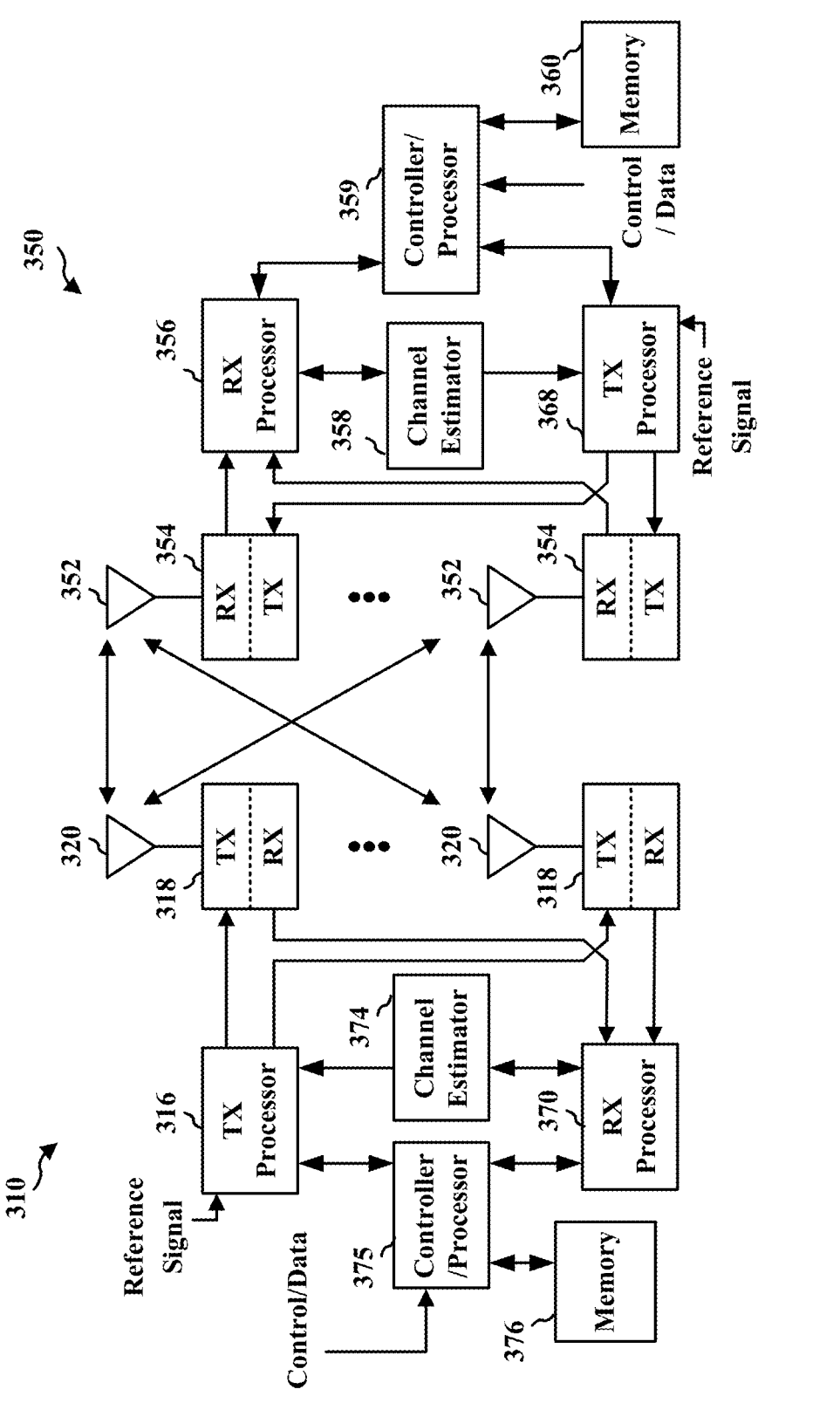
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the unified TCI process component 198 of FIG. 1.

At least one of the TX processor 316, the RX processor 370, and the controller/processor 375 may be configured to perform aspects in connection with the unified TCI configuration component 199 of FIG. 1.

In a wireless communication between abase station and a UE involving beamforming and/or multiple transmission (TX)/reception (RX) beams, the base station and the UE may perform beam management to determine which downlink (DL) beam(s) may be used for the DL operation and/or which uplink (UL) beam(s) may be used for the UL operation based on measuring at least one reference signal (RS) transmitted from different DL/UL beams.

For example, a UE may be configured to select a DL RX beam (e.g., a receiving beam at the UE) for a DL TX beam (e.g., a transmitting beam at a base station). When a base station is communicating with the UE through multiple DL TX beams, the base station may include reference signal(s), such as CSI-RS and/or SSB, in one or more DL TX beams of the base station. Then, the UE may measure the reference signal(s) in the one or more DL TX beams, such as by measuring their received power, and the UE may determine which DL TX beam(s) may be used by the base station, such as beam(s) with a highest signal measurement. The UE may report its determination (e.g., which DL TX beams to use) to the base station, and the base station may communicate with the UE using the DL TX beam(s) reported by the UE. Similarly, a base station may also determine which DL TX beam(s) may be used for communicating with the UE. For example, when a UE is communicating with a base station via multiple UL TX beams, the UE may be configured to include reference signal(s), such as SRS and/or DMRS, in one or more UL TX beams of the UE. Then, the base station may receive and measure the reference signal(s) in the one or more UL TX beams via one or more UL RX beam(s) of the base station, and the base station may determine which UL RX beam(s) have better or more suitable signal measurements. Based on the determination, the base station may select DL TX beam(s) (e.g., DL TX beam(s) that correspond to the UL RX beam(s) with a better measurement) for communicating with the UE. The base station may indicate its determination (e.g., which DL TX beam(s) is to be used by the base station) to the UE, and the UE may communicate with the base station using corresponding DL RX beam(s) and/or UL TX beam(s) based on the indication. The reference signal(s) may be configured, such as by the base station, to be aperiodic, periodic, or semi-persistent. For example, a base station may configure aperiodic SRS for a UE, such that the UE may transmit SRS. In some examples, a base station may indicate to a UE regarding the reference signal(s) for UL and/or DL (e.g., to indicate to the UE to transmit SRS to the base station and/or to measure CSI-RS received from the base station, etc.) in downlink control information (DCI).

In one example, after a UE measures reference signal(s) transmitted from a base station, the UE may transmit a beam measurement report (e.g., a CSI report) to the base station.

Based on the beam measurement report, the base station may select a DL RX beam for the UE, and may indicate the selected DL RX beam to the UE via a downlink-transmission configuration indication (DL-TCI) field of DCI, such as DL DCI that carries a DL grant. In other words, the DL-TCI may indicate a reference signal (e.g., a CSI-RS) that corresponds to a selected DL TX beam of the base station (e.g., the DL TX beam that corresponds to the selected DL RX of the UE). Based on the DL-TCI indication received, the UE may select the DL RX beam for DL reception. In another example, a base station may indicate/trigger a UE to transmit reference signal(s) (e.g., the SRS), where the indication may be transmitted to the UE via DCI (e.g., DL DCI or UL DCI). In response to the indication, the UE may transmit the reference signal to the base station, and the base station may measure the reference signal and select a DL RX beam for the UE for DL reception at the UE. Similarly, the base station may indicate the DL RX beam selection via the DL-TCI field of DCI, such as DL DCI that carries a DL grant. The DL-TCI may indicate a reference signal (e.g., the SRS) representing the selected DL RX beam. Based on the DL-TCI indication received, the UE may select the DL RX beam for DL reception.

In some examples, after a base station receives a beam measurement report (e.g., a CSI report) from a UE, the base station may also use the beam report to select an UL TX beam for the UE and indicate the selected UL TX beam using an UL-TCI field of DCI, such as UL DCI that carries an UL grant. Based on the UL-TCI indication received, the UE may select the UL TX beam for DL transmission. Similarly, a base station may indicate/trigger a UE to transmit reference signal (e.g., the SRS), where the indication may be transmitted to the UE via DCI (e.g., DL DCI or UL DCI). In response to the indication, the UE may transmit the reference signal to the base station, and the base station may measure the reference signal and select an UL TX beam for the UE for UL transmission. Similarly, the base station may indicate the selected UL TX beam using an UL-TCI field of DCI, such as UL DCI that carries an UL grant. Based on the UL-TCI indication received, the UE may select the UL TX beam for DL transmission.

Aspects presented herein may enable a base station to transmit a joint TCI indication for DL and/or UL transmissions (e.g., a unified beam indication framework) instead of transmitting the DL beam indication and the UL beam indication separately to converse radio resource overhead and to improve the efficiency of beam indication for wireless communication devices, e.g., instead of associating a DL beam indication with a DL-TCI and an UL beam indication with an UL-TCI, etc. For purposes of the present disclosure, the term "TCI" may at least comprise a TCI state that includes at least one source reference signal (e.g., CSI-RS, SRS, etc.) to provide a reference for a UE to determine quasi-co-location (QCL) and/or spatial filter for UL TX and/or DL RX. While signals transmitted from the same antenna port may be more likely to have the same or similar radio channel properties (e.g., Doppler spread) and signals transmitted from different antenna ports may be more likely to have different radio channel properties, different antenna ports or signals (e.g., reference signals) transmitted from different antenna ports may be referred to as quasi-co-located or having a QCL relationship if they have the same or similar radio channel properties. Also, for purposes of the present disclosure, the term "joint TCI indication," "joint TCI indication for DL and UL," "unified beam indication," and "unified TCI indication" may be used interchangeably.

In one aspect, a unified TCI indication may include at least the following types: (1) a joint DL/UL common TCI state which may be used (e.g., by abase station) to indicate a common beam for at least one DL channel/RS and at least one UL channel/RS (e.g., Type 1), (2) a separate DL common TCI state which may be used to indicate a common beam for at least two DL channel/RS (e.g., Type 2), (3) a separate UL common TCI state which may be used to indicate a common beam for at least two UL channel/RS (e.g., Type 3), (4) a separate DL single channel/RS TCI state which may be used to indicate a beam for a single DL channel/RS (e.g., Type 4), and (5) a separate UL single channel/RS TCI state which may be used to indicate a beam for a single UL channel/RS (e.g., Type 5). A unified TCI state indication may include a QCL indication across multiple CCs. As such, the unified TCI state indication may be used for optimization of using the TCI state indication, for updating the spatial QCL reference in the TCI state indication, and/or for UL/DL beam indication, etc.

In one example, for DL reception at the UE, a unified TCI state indication (e.g., a unified beam indication) may include one or more source reference signal(s) in multiple TCIs (e.g., M TCIs) to provide common QCL information at least for UE-dedicated reception on a PDSCH (e.g., for UE-dedicated channels) and/or for all or a subset of control resource sets (CORESETs) in a component carrier (CC). In some examples, this common QCL information may also apply to CSI-RS resource for CSI reporting, CSI-RS resource for beam management (BM), and/or CSI-RS for beam tracking, etc. In other examples, the common QCL information may also apply to a PDSCH including a PDSCH default beam.

For purposes of the present disclosure, the term "dedicated" or "dedicated channel" may refer to one or more channels that may be used between one UE and a base station (e.g., point-to-point). For example, a base station may use a dedicated control channel to transmit dedicated control information to a target UE, and/or use a dedicated traffic channel to transmit dedicated traffic to a target UE, where the base station may transmit dedicated control information and/or traffic based on a scrambling (e.g., a scrambling based on cell radio network temporary identifier (C-RNTI)) that may be decoded by the target UE, and may not be decoded by other receiving UEs. On the other hand, for purposes of the present disclosure, the term "non-dedicated" or "non-dedicated channel" may refer to one or more channels that are common to one or more UEs, where the one or more UEs may receive or have access to the one or more channels. For example, a non-dedicate channel may include a broadcast control/shared channel, a multicast control/shared channel, and/or a groupcast control/shared channel, etc.

In another example, a unified TCI state indication may include one or more source reference signal(s) in multiple TCIs (e.g., N TCIs) to provide a reference for a UE to determine common UL TX spatial filter(s) at least for dynamic-grant (DG)/configured-grant (DG) based PUSCH, and/or for all or a subset of dedicated PUCCH resources in a CC, where N (e.g., number of TCIs) may be selected between N equal to one (e.g., N=1) or Nis greater than or equal to one (e.g., N≥1). In some examples, the common UL TX spatial filter may also apply to one or more SRS resources in one or more resource set(s) configured for antenna switching, codebook-based, and/or non-codebook-based UL transmissions. In other examples, the common UL TX spatial filter may apply to SRS configured for BM. In addition, a UE may determine PUSCH port(s) based on the joint TCI, e.g., PUSCH port(s) to be mapped with SRS ports.

In other words, to accommodate a separate beam indication for UL and DL transmissions, a unified TCI state indication may utilize/provide two separate TCI states, one for DL transmission and one for UL transmission. For example, for the separate DL TCI of the unified TCI state indication, the source reference signal(s) in multiple TCIs (e.g., M TCIs) may provide QCL information at least for UE-dedicated reception on a PDSCH and for UE-dedicated reception on all or a subset of CORESETs in a CC. For the separate UL TCI of the unified TCI state indication, the source reference signal(s) in multiple TCIs (e.g., N TCIs) may provide a reference for a UE to determine common UL TX spatial filter(s) at least for DG/CG-based PUSCH, and/or all or a subset of dedicated PUCCH resources in a CC. Optionally, the common UL TX spatial filter may also apply to all or at least one SRS resource(s) in one or more resource set(s) configured for antenna switching/codebook-based/non-codebook-based UL transmissions. In some examples, within a defined frequency range such as the FR1 or a lower frequency range, a UE may be configured not to expect an UL TCI to provide a source reference signal for determining common UL TX spatial filter(s), if the UL TCI is supported for the defined frequency range.

In some examples, a base station may include non-serving cell information (e.g., information of another base station) in a TCI. For example, a base station may include at least a physical cell identifier (PCI) of one or more non-serving cells in a TCI to support inter-cell, multi-DCI, and/or multi-TRP operations, where the indication of the PCI may be implicit or explicit.

Aspects presented herein may provide unified TCI state indication for non-dedicated channels. Aspects provided herein may include non-serving cell information in a unified TCI state indication and/or may associate the non-serving cell information with the unified TCI state indication. For example, aspects presented herein may enable a base station to apply unified TCI which may include the non-serving cell information to non-dedicated UE channels and/or non-dedicated UE reference signal(s).

FIG. 4 is a communication flow 400 illustrating an example of a unified TCI state indication for non-dedicated DL channels and/or DL signals (collectively as "non-dedicated DL channel/signal") according to aspects of the present disclosure. At 410, a base station 402 may transmit a unified TCI state indication 412 that is associated with a non-dedicated DL channel/signal 420 to one or more UEs, which may include a first UE 404, a second UE 406 and up to N$^{th}$ UE 408, etc. The unified TCI state indication 412 may include at least one of: a joint DL/UL common TCI state which may be used for indicating a common beam for at least one DL channel/RS and at least one UL channel/RS (e.g., Type 1), a separate DL common TCI state which may be used for indicating a common beam for at least two DL channel/RS (e.g., Type 2), a separate UL common TCI state which may be used for indicating a common beam for at least two UL channel/RS (e.g., Type 3), a separate DL single channel/RS TCI state which may be used for indicating a beam for a single DL channel/RS (e.g., Type 4), and/or a separate UL single channel/RS TCI state which may be used for indicating a beam for a single UL channel/RS (e.g., Type 5), etc. For example, for the non-dedicated DL channel/signal 420, Type 1 and Type 2 unified TCI state indication may be used for the unified TCI state indication 412.

In one example, the at least one non-dedicated DL channel/signal 420 may include at least one of a broadcast channel or broadcast signal, a multicast channel or multicast signal, and/or a groupcast channel or groupcast signal. For example, the non-dedicated DL channel/signal 420 may include a broadcast PDCCH and/or PDSCH that is associated with CORESET zero (e.g., CORESET #0), a broadcast PDCCH and/or PDSCH that is associated with CORESET including search space (SS) zero (e.g., CORESET with SS0), and/or a broadcast PDCCH and/or PDSCH that is associated with CORESETs including common SS (CSS) (e.g., CORESETs with CSS), etc. In another example, the non-dedicated DL channel/signal 420 may include a PDSCH with a common configuration in a serving base station, such as the base station 402. In some aspects, the non-dedicated DL channel/signal 420 may include a PDSCH that is configured to be associated with an RRC signaling such as "PDSCH-ConfigCommon" from the base station 402. In some others aspects, the non-dedicated DL channel/signal 420 may include a PDCCH that is configured to be associated with an RRC signaling such as "PDCCH-ConfigCommon", "PDCCH-ConfigSIB1", or "PDCCH-ServingCellConfig" from the base station 402. For example, the PDSCH with a common configuration may be a second random access message (e.g., Msg B) of a two-step physical random-access channel (PRACH), and/or a second and/or a fourth random access message (e.g., Msg 2/4) of a four-step PRACH, etc. In another example, the non-dedicated DL channel/signal 420 may include at least one of a multicast PDCCH and/or a multicast PDSCH. In another example, the non-dedicated DL channel/signal 420 may include at least one of a groupcast PDCCH and/or a groupcast PDSCH. For example, the groupcast PDCCH and/or PDSCH may be associated with a RNTI which is common to the multiple UEs, such as a "G-RNTI".

In another example, the base station 402 may transmit the unified TCI state indication 412 to the one or more UEs via a radio resource control (RRC) signaling and/or a medium access control (MAC) control element (CE) (MAC-CE), where the unified TCI state indication 412 may be configured to apply to all or a subset of the non-dedicated DL channel/signal 420 mentioned above (e.g., the broadcast, the multicast, and/or the groupcast channels) based on the RRC and/or MAC-CE indication(s). For example, the applicable DL channel/signals to a unified TCI state indication 412 may be configured to apply per TCI, per channel type, or both per TCI and per channel type, etc. In some examples, the applicable DL channel/signals may be different to each unified TCI state indication. In some other examples, the types of applicable DL channel/signals, (e.g., such as the broadcast, the multicast, and/or the groupcast channels) may be different to each unified TCI state indication.

In another example, the base station 402 may include at least one non-serving cell information in the unified TCI state indication. For example, the base station 402 may include cell information of another base station, such as the PCI of the another base station, in the unified TCI state indication 412 for the non-dedicated DL channel/signal 420. In other examples, the base station 402 may be configured not to include non-serving cell information in the unified TCI state indication, such as the unified TCI state indication 412 for the non-dedicated DL channel/signal 420.

At 414, the one or more UEs that receive the unified TCI state indication 412 may determine QCL information 416 for the non-dedicated DL channel/signal 420 based on one or more source reference signals in the received unified TCI state indication 412. For example, after the first UE 404 receives the unified TCI state indication 412 from the base station 402, the first UE 404 may determine QCL information for the communication of the at least one non-dedicated DL channel/signal 420 based on one or more source reference signals for the received unified TCI state indication 412.

At 418, the base station 402 may transmit the non-dedicated DL channel/signal 420 to one or more UEs, such as the first UE 404, the second UE 406, and/or the N^{th} UE 408, based on the transmitted unified TCI state indication 412 and the QCL information 416 associated with one or more source reference signals of the unified TCI state indication 412.

At 422, the one or more UEs may receive the non-dedicated DL channel/signal 420 based on the received TCI state indication 412 and the determined QCL information 416. For example, the first UE 404 may receive the non-dedicated DL channel/signal 420 from the base station 402 based on the received TCI state indication 412 and the determined QCL information 416.

FIG. 5 is a communication flow 500 illustrating an example of a unified TCI state indication for non-dedicated UL channels and/or UL signals (collectively as "non-dedicated UL channel/signal") according to aspects of the present disclosure. At 510, a base station 502 may transmit a unified TCI state indication 512 that is associated with a non-dedicated UL channel/signal 520 to one or more UEs, which may include a first UE 504, a second UE 506 and up to N^{th} UE 508, etc. The unified TCI state indication 512 may include at least one of: a joint DL/UL common TCI state which may be used for indicating a common beam for at least one DL channel/RS and at least one UL channel/RS (e.g., Type 1), a separate DL common TCI state which may be used for indicating a common beam for at least two DL channel/RS (e.g., Type 2), a separate UL common TCI state which may be used for indicating a common beam for at least two UL channel/RS (e.g., Type 3), a separate DL single channel/RS TCI state which may be used for indicating a beam for a single DL channel/RS (e.g., Type 4), and/or a separate UL single channel/RS TCI state which may be used for indicating a beam for a single UL channel/RS (e.g., Type 5), etc. For example, for the non-dedicated UL channel/signal 520, Type 1 and Type 3 unified TCI states may be used for the unified TCI state indication 512.

In one example, the at least one non-dedicated UL channel/signal 520 may include at least one of a broadcast channel or broadcast signal, a multicast channel or multicast signal, and/or a groupcast channel or groupcast signal. For example, the non-dedicated UL channel/signal 520 may include a broadcast PUCCH that is associated with CORESET zero (e.g., CORESET #0), a broadcast PUCCH that is associated with CORESET with SS0, and/or a broadcast PUCCH that is associated with CORESETs with CSS, etc. In another example, the non-dedicated UL channel/signal 520 may include PUSCH and/or PUCCH with a common configuration in a serving base station, such as the base station 502. In some aspects, the non-dedicated UL channel/signal 420 may include a PUSCH that is configured to be associated with a RRC signaling such as "PUSCH-ConfigCommon" from the base station 402. In some others aspects, the non-dedicated UL channel/signal 420 may include a PUCCH that is configured to be associated with a RRC signaling such as "PUCCH-ConfigCommon", or "PUCCH-ServingCellConfig" from the base station 402. For example, the PUSCH and/or PUCCH with a common configuration may be a first random access message (e.g., Msg A) of a two-step PRACH, and/or a third random access message (e.g., Msg 3) of a four-step PRACH, etc. In another example, the non-dedicated UL channel/signal 520 may be a PRACH preamble transmission, such as a first random access message (e.g., Msg A) of a two-step PRACH and/or a first random access message (e.g., Msg 1) of a four-step PRACH, etc. In some aspect, the PUSCH and/or PUCCH may be the one transmitted in response to the non-dedicated PDCCH or PDSCH. For example, the non-dedicated UL channel/signal 520 may be a PUCCH or PUSCH carrying the ACK or NACK information to a non-dedicated PDCCH or PDSCH. In another example, the non-dedicated UL channel/signal 520 may include at least one of a multicast PUCCH and/or a multicast PUSCH. In another example, the non-dedicated DL channel/signal 520 may include at least one of a group-cast PUCCH and/or a groupcast PUSCH. For example, the group-cast PUCCH or PUSCH may be associated with a RNTI which is common to the multiple UEs, such as a "G-RNTI".

In another example, the base station 502 may transmit the unified TCI state indication 512 to the one or more UEs via an RRC signaling and/or a MAC-CE, where the unified TCI state indication 512 may be configured to apply to all or a subset of the non-dedicated UL channel/signal 520 mentioned above (e.g., the broadcast, the multicast, and/or the groupcast channels) based on the RRC and/or MAC-CE indication(s). For example, the unified TCI state indication 512 may be configured to apply per TCI, per channel type or both per TCI and per Channel type, etc. In some examples, the applicable UL channel/signals may be different to each unified TCI state indication. In some other examples, the types of applicable UL channel/signals, (e.g., such as the broadcast, the multicast, and/or the groupcast channels) may be different to each unified TCI state indication.

In another example, the base station 502 may include at least one non-serving cell information in the unified TCI state indication. For example, the base station 502 may include cell information of another base station, such as the PCI of the another base station, in the unified TCI state indication 512 for the non-dedicated UL channel/signal 520. In other examples, the base station 502 may be configured not to include non-serving cell information in the unified TCI state, such as the unified TCI state indication 512 for the non-dedicated UL channel/signal 520.

At 514, the one or more UEs that receive the unified TCI state indication 512 may determine a spatial filter 516 for the non-dedicated UL channel/signal 520 based on one or more source reference signals in the received unified TCI state indication 512. For example, after the first UE 504 receives the unified TCI state indication 512 from the base station 502, the first UE 504 may determine a spatial filter for the communication of the at least one non-dedicated UL channel/signal 520 based on one or more source reference signals for the received unified TCI state indication 512.

At 522, the one or more UEs may transmit the non-dedicated UL channel/signal 520 based on the received TCI state indication 512 and the determined spatial filter 516. For example, the first UE 504 may transmit the non-dedicated DL channel/signal 520 to the base station 502 based on the received TCI state indication 512 and the determined spatial filter 516. In other words, the base station 502 may receive at least one non-dedicated DL channel/signal 520 based on the transmitted TCI state indication 512 and the spatial filter 516 that is associated with one or more source reference signals of the TCI state indication 512.

In another aspect of the present disclosure, a UE may be configured not to support the source reference signal(s) in the unified TCI indication to provide common QCL information or spatial filter information for any non-dedicated UE channel in a CC. For example, if a UE receives a unified TCI indication for non-dedicated channel/signal (e.g., for UL and/or DL), the UE may be refrained from applying QCL information and/or a spatial filter for the communication of the non-dedicated channel/signal based on one or more source reference signals in the unified TCI indication.

Figure 6:
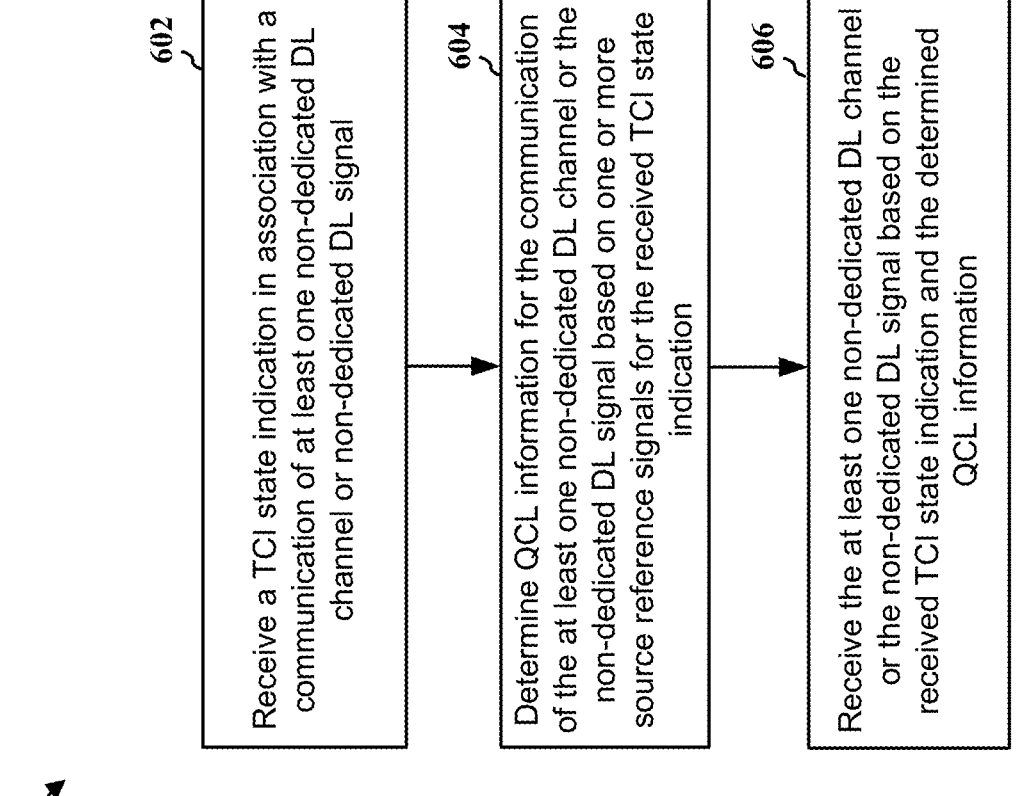
FIG. 6 is a flowchart of a method of wireless communication in accordance with aspects presented herein.

FIG. 6 is a flowchart 600 of a method of wireless communication. The method may be performed by a UE or a component of a UE (e.g., the UE 104, 350, 404, 406, 408; the apparatus 702; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to determine QCL information for non-dedicated channel and/or signal based on a unified TCI indication.

At 602, the UE may receive a TCI state indication in association with a communication of at least one non-dedicated DL channel or non-dedicated DL signal, such as described in connection with FIG. 4. For example, at 412, the first UE 404 may receive a unified TCI state indication 412 in association with a communication of at least one non-dedicated DL channel/signal 420. The reception of the TCI state indication may be performed, e.g., by the TCI process component 740 and/or the reception component 730 of the apparatus 702 in FIG. 7.

In one example, the TCI state indication may be a unified TCI state indication, and the unified TCI state indication may include at least one of a joint DL or UL common TCI state indicating a common beam for at least one DL channel or DL RS and at least one UL channel or UL RS, or a separate DL common TCI state indicating a common beam for at least two DL channels or DL RSs.

In another example, the at least one of the non-dedicated DL channel or the non-dedicated DL signal may include a broadcast channel or broadcast signal, a multicast channel or multicast signal, or a groupcast channel or groupcast signal. For example, the broadcast channel or broadcast signal may include at least one of a broadcast PDCCH associated with CORESET zero, a PDCCH associated with CORESET including SS zero, a PDCCH associated with CORESETs including CSS, a PDSCH associated with CORESET zero, a PDSCH associated with CORESET including SS zero, or a PDSCH associated with CORESETs including CSS. The broadcast channel or broadcast signal may include a PDSCH with a common configuration in a serving base station. The multicast channel or multicast signal may include at least one of a multicast PDCCH or a multicast PDSCH. The groupcast channel or groupcast signal may include at least one of a groupcast PDCCH or a groupcast PDSCH.

In another example, the TCI state may be received via one of RRC signaling or a MAC-CE. In such an example, the received RRC signaling or the MAC-CE may be associated with one TCI state indication, the one TCI state indication being the received TCI state indication. In such an example, the received RRC signaling or the MAC-CE may be associated with one channel type, the at least one non-dedicated channel or the non-dedicated signal being the one channel type. In such an example, the received RRC signaling or the MAC-CE may be associated with one TCI state indication and one channel type, the one TCI state indication being the received TCI state indication, the at least one non-dedicated channel or the non-dedicated signal being the one channel type.

In another example, the TCI state indication may indicate non-serving cell information, or the TCI state indication may not indicate non-serving cell information.

At 604, the UE may determine QCL information for the communication of the at least one non-dedicated DL channel or the non-dedicated DL signal based on one or more source reference signals for the received TCI state indication, such as described in connection with FIG. 4. For example, at 414, the first UE 404 may determine QCL information 416 for non-dedicated DL channel/signal 420 based on one or more source reference signals in the received TCI state indication 412. The determination of the QCL information may be performed, e.g., by the QCL determination component 742 of the apparatus 702 in FIG. 7.

At 606, the UE may receive the at least one non-dedicated DL channel or the non-dedicated DL signal based on the received TCI state indication and the determined QCL information, such as described in connection with FIG. 4. For example, at 422, the first UE 404 may receive the non-dedicated DL channel/signal 420 based on the received TCI state indication 412 and the determined QCL information 416. The reception of the non-dedicated DL channel/RS may be performed, e.g., by the non-dedicated channel and signal process component 744 and/or the reception component 730 of the apparatus 702 in FIG. 7.

Figure 7:
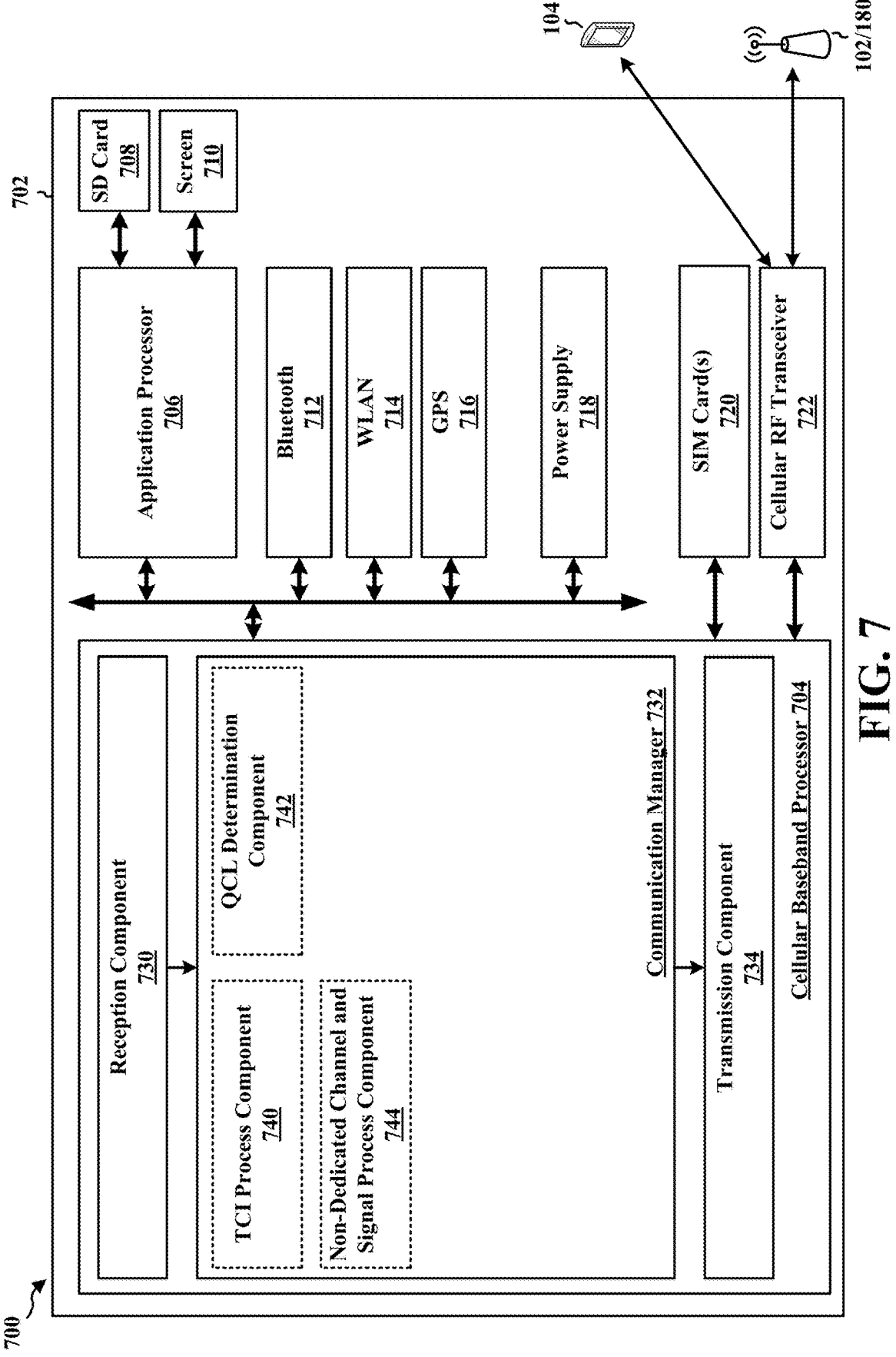
FIG. 7 is a diagram illustrating an example of a hardware implementation for an example apparatus in accordance with aspects presented herein.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or BS 102/180. The cellular baseband processor 704 may include a computer-readable medium/ memory. The computer-readable medium/memory may be non-transitory. The cellular baseband processor 704 is responsible for general processing, including the execution of software stored on the computer-readable medium/ memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see 350 of FIG. 3) and include the aforediscussed additional modules of the apparatus 702.

The communication manager 732 includes a TCI process component 740 that is configured to receive a TCI state indication in association with a communication of at least one non-dedicated DL channel or non-dedicated DL signal, e.g., as described in connection with 602 of FIG. 6. The communication manager 732 further includes a QCL determination component 742 that is configured to determine QCL information for the communication of the at least one non-dedicated DL channel or the non-dedicated DL signal based on one or more source reference signals for the received TCI state indication, e.g., as described in connection with 604 of FIG. 6. The communication manager 732 further includes a non-dedicated channel and signal process component 744 that is configured to receive the at least one non-dedicated DL channel or the non-dedicated DL signal based on the received TCI state indication and the determined QCL information, e.g., as described in connection with 606 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for receiving a TCI state indication in association with a communication of at least one non-dedicated DL channel or non-dedicated DL signal (e.g., the TCI process component 740 and/or the reception component 730). The apparatus 702 includes means for determining QCL information for the communication of the at least one non-dedicated DL channel or the non-dedicated DL signal based on one or more source reference signals for the received TCI state indication (e.g., the QCL determination component 742). The apparatus 702 includes means for receiving the at least one non-dedicated DL channel or the non-dedicated DL signal based on the received TCI state indication and the determined QCL information (e.g., the non-dedicated channel and signal process component 744 and/or the reception component 730).

In one configuration, the TCI state indication may be a unified TCI state indication, and the unified TCI state indication may include at least one of a joint DL or UL common TCI state indicating a common beam for at least one DL channel or DL RS and at least one UL channel or UL RS, or a separate DL common TCI state indicating a common beam for at least two DL channels or DL RSs.

In another configuration, the at least one of the non-dedicated DL channel or the non-dedicated DL signal may include a broadcast channel or broadcast signal, a multicast channel or multicast signal, or a groupcast channel or groupcast signal. In such a configuration, the broadcast channel or broadcast signal may include at least one of a broadcast PDCCH associated with CORESET zero, a PDCCH associated with CORESET including SS zero, a PDCCH associated with CORESETs including CSS, a PDSCH associated with CORESET zero, a PDSCH associated with CORESET including SS zero, or a PDSCH associated with CORESETs including CSS. The broadcast channel or broadcast signal may include a PDSCH with a common configuration in a serving base station. The multicast channel or multicast signal may include at least one of a multicast PDCCH or a multicast PDSCH. The groupcast channel or groupcast signal may include at least one of a groupcast PDCCH or a groupcast PDSCH.

In another configuration, the TCI state may be received via one of RRC signaling or a MAC-CE. In such a configuration, the received RRC signaling or the MAC-CE may be associated with one TCI state indication, the one TCI state indication being the received TCI state indication. In such a configuration, the received RRC signaling or the MAC-CE may be associated with one channel type, the at least one non-dedicate d channel or the non-dedicated signal being the one channel type. In such a configuration, the received RRC signaling or the MAC-CE may be associated with one TCI state indication and one channel type, the one TCI state indication being the received TCI state indication, the at least one non-dedicated channel or the non-dedicated signal being the one channel type.

In another configuration, the TCI state indication may indicate non-serving cell information, or the TCI state indication may not indicate non-serving cell information.

The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 8 is a flowchart 800 of a method of wireless communication. The method may be performed by a base station or a component of a base station (e.g., the base station 102, 180, 310, 402; the apparatus 902; a processing system, which may include the memory 376 and which may be the entire base station 310 or a component of the base station 310, such as the TX processor 316 the RX processor 370, and/or the controller/processor 375). Optional aspects are illustrated with a dashed line. The method may enable the base station to transmit unified TCI state indication for non-dedicated channel.

At 802, the base station may transmit a TCI state indication in association with a communication of at least one non-dedicated DL channel or non-dedicated DL signal, such as described in connection with FIG. 4. For example, at 410, the base station 402 may transmit unified TCI state indication 412 to one or more UEs that is in association with a communication of at least one non-dedicated DL channel/signal 420. The transmission of the TCI state indication may be performed, e.g., by the TCI configuration component 940 and/or the transmission component 934 of the apparatus 902 in FIG. 9.

In one example, the TCI state indication may be a unified TCI state indication, and the unified TCI state indication may include at least one of a joint DL or UL common TCI state indicating a common beam for at least one DL channel or DL RS and at least one UL channel or UL RS, or a separate DL common TCI state indicating a common beam for at least two DL channels or DL RSs.

In another example, the at least one of the non-dedicated DL channel or the non-dedicated DL signal may include a broadcast channel or broadcast signal, a multicast channel or multicast signal, or a groupcast channel or groupcast signal. For example, the broadcast channel or broadcast signal may include at least one of a broadcast PDCCH associated with CORESET zero, a PDCCH associated with CORESET including SS zero, a PDCCH associated with CORESETs including CSS, a PDSCH associated with CORESET zero, a PDSCH associated with CORESET including SS zero, or a PDSCH associated with CORESETs including CSS. The broadcast channel or broadcast signal may include a PDSCH with a common configuration in a serving base station. The multicast channel or multicast signal may include at least one of a multicast PDCCH or a multicast PDSCH. The groupcast channel or groupcast signal may include at least one of a groupcast PDCCH or a groupcast PDSCH.

In another example, the TCI state indication may be transmitted via one of RRC signaling or a MAC-CE. In such an example, the transmitted RRC signaling or the MAC-CE may be associated with one TCI state indication, the one TCI state indication being the received TCI state. In such an example, the transmitted RRC signaling or the MAC-CE may be associated with one channel type, the at least one non-dedicated channel or the non-dedicated signal being the one channel type. In such an example, the transmitted RRC signaling or the MAC-CE may be associated with one TCI state indication and one channel type, the one TCI state indication being the received TCI state indication, the at least one non-dedicated channel or the non-dedicated signal being the one channel type.

In another example, the TCI state indication may indicate non-serving cell information, or the TCI state indication may not indicate non-serving cell information.

At 804, the base station may transmit the at least one non-dedicated DL channel or the non-dedicated DL signal based on the transmitted TCI state indication and QCL information associated with one or more source reference signals of the transmitted TCI state indication, such as described in connection with FIG. 4. For example, at 418, the base station 402 may transmit the non-dedicated DL channel/signal 420 based on the transmitted TCI state indication and QCL information associated with one or more source reference signals of the transmitted TCI state indication. The transmission of the non-dedicated DL channel or the non-dedicated DL signal may be performed, e.g., by the non-dedicated channel/RS transmission component 942 and/or the transmission component 934 of the apparatus 902 in FIG. 9.

Figure 9:
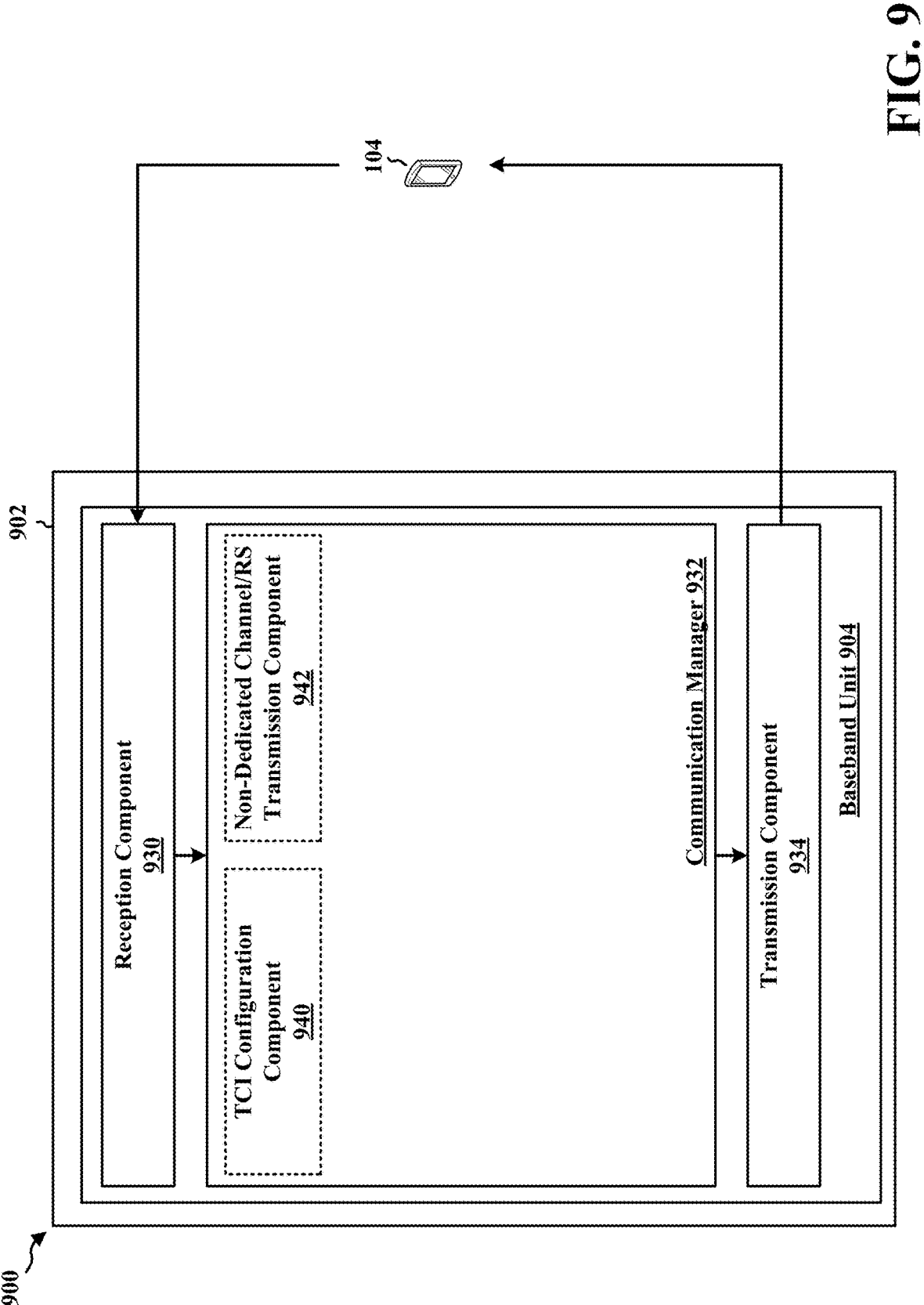
FIG. 9 is a diagram illustrating an example of a hardware implementation for an example apparatus in accordance with aspects presented herein.

FIG. 9 is a diagram 900 illustrating an example of a hardware implementation for an apparatus 902. The apparatus 902 is a BS and includes a baseband unit 904. The baseband unit 904 may communicate through a cellular RF transceiver with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a TCI configuration component 940 that is configured to transmit a TCI state indication in association with a communication of at least one non-dedicated DL channel or non-dedicated DL signal, e.g., as described in connection with 802 of FIG. 8. The communication manager 932 further includes a non-dedicated channel/RS transmission component 942 that is configured to transmit the at least one non-dedicated DL channel or the non-dedicated DL signal based on the transmitted TCI state indication and QCL information associated with one or more source reference signals of the transmitted TCI state indication, e.g., as described in connection with 804 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for transmitting a TCI state indication in association with a communication of at least one non-dedicated DL channel or non-dedicated DL signal (e.g., the TCI configuration component 940 and/or the transmission component 934). The apparatus 902 includes means for transmitting the at least one non-dedicated DL channel or the non-dedicated DL signal based on the transmitted TCI state indication and QCL information associated with one or more source reference signals of the transmitted TCI state indication (e.g., the non-dedicated channel/RS transmission component 942 and/or the transmission component 934).

In one configuration, the TCI state indication may be a unified TCI state indication, and the unified TCI state indication may include at least one of a joint DL or UL common TCI state indicating a common beam for at least one DL channel or DL RS and at least one UL channel or UL RS, or a separate DL common TCI state indicating a common beam for at least two DL channels or DL RSs.

In another configuration, the at least one of the non-dedicated DL channel or the non-dedicated DL signal may include a broadcast channel or broadcast signal, a multicast channel or multicast signal, or a groupcast channel or groupcast signal. In such a configuration, the broadcast channel or broadcast signal may include at least one of a broadcast PDCCH associated with CORESET zero, a PDCCH associated with CORESET including SS zero, a PDCCH associated with CORESETs including CSS, a PDSCH associated with CORESET zero, a PDSCH associated with CORESET including SS zero, or a PDSCH associated with CORESETs including CSS. The broadcast channel or broadcast signal may include a PDSCH with a common configuration in a serving base station. The multicast channel or multicast signal may include at least one of a multicast PDCCH or a multicast PDSCH. The groupcast channel or groupcast signal may include at least one of a groupcast PDCCH or a groupcast PDSCH.

In another configuration, the TCI state indication may be transmitted via one of RRC signaling or a MAC-CE. In such a configuration, the transmitted RRC signaling or the MAC-CE may be associated with one TCI state indication, the one TCI state indication being the received TCI state indication. In such a configuration, the transmitted RRC signaling or the MAC-CE may be associated with one channel type, the at least one non-dedicated channel or the non-dedicated signal being the one channel type. In such a configuration, the transmitted RRC signaling or the MAC-CE may be associated with one TCI state indication and one channel type, the one TCI state indication being the received TCI state indication, the at least one non-dedicated channel or the non-dedicated signal being the one channel type.

In another configuration, the TCI state indication may indicate non-serving cell information, or the TCI state indication may not indicate non-serving cell information.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

FIG. 10 is a flowchart 1000 of a method of wireless communication. The method may be performed by a UE or a component of a UE (e.g., the UE 104, 350, 504, 506, 508; the apparatus 1102; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to determine a spatial filter for non-dedicated channel and/or signal based on a unified TCI indication.

At 1002, the UE may receive a TCI state indication in association with a communication of at least one non-dedicated UL channel or non-dedicated UL signal, such as described in connection with FIG. 5. For example, at 512, the first UE 404 may receive a unified TCI state indication 512 in association with a communication of at least one non-dedicated UL channel/signal 520. The reception of the TCI state indication may be performed, e.g., by the TCI process component 1140 and/or the reception component 1130 of the apparatus 1102 in FIG. 11.

In one example, the TCI state indication may be a unified TCI state indication, and the unified TCI state indication may include at least one of a joint DL or UL common TCI state indicating a common beam for at least one DL channel or DL RS and at least one UL channel or UL RS, or a separate UL common TCI state indicating a common beam for at least two UL channels or UL RSs.

In another example, the at least one of the non-dedicated UL channel or the non-dedicated UL signal may include a broadcast channel or broadcast signal, a multicast channel or multicast signal, or a groupcast channel or groupcast signal. In such an example, the broadcast channel or broadcast signal may include at least one of a PUCCH associated with CORESET zero, a PUCCH associated with CORESET including SS zero, or a PUCCH associated with CORESETs including CSS. The broadcast channel or broadcast signal may include at least one of a PUSCH with a common configuration in a serving base station or a PUCCH with a common configuration in a serving base station. The broadcast channel or broadcast signal may include a physical random access channel preamble. The multicast channel or multicast signal may include at least one of a multicast PUCCH or a multicast PUSCH. The groupcast channel or groupcast signal may include at least one of a groupcast PUCCH or a groupcast PUSCH.

In another example, the TCI state indication may be received via one of RRC signaling or a MAC-CE. In such an example, the received RRC signaling or the MAC-CE may be associated with one TCI state indication, the one TCI state indication being the received TCI state indication. In such an example, the received RRC signaling or the MAC- CE may be associated with one channel type, the at least one non-dedicated channel or the non-dedicated signal being the one channel type. In such an example, the received RRC signaling or the MAC-CE may be associated with one TCI state indication and one channel type, the one TCI state indication being the received TCI state indication, the at least one non-dedicated channel or the non-dedicated signal being the one channel type.

In another example, the TCI state indication may indicate non-serving cell information, or the TCI state indication may not indicate non-serving cell information.

At 1004, the UE may determine a spatial filter for the communication of the at least one non-dedicated UL channel or the non-dedicated UL signal based on one or more source reference signals for the received TCI state indication, such as described in connection with FIG. 5. For example, at 514, the first UE 404 may determine a spatial filter 516 for non-dedicated UL channel/signal 520 based on one or more source reference signals in the received TCI state indication 512. The determination of the spatial filter may be performed, e.g., by the spatial filter determination component 1142 of the apparatus 1102 in FIG. 11.

At 1006, the UE may transmit the at least one non-dedicated UL channel or the non-dedicated UL signal based on the received TCI state indication and the determined spatial filter, such as described in connection with FIG. 5. For example, at 522, the first UE 404 may transmit the non-dedicated UL channel/signal 520 based on the received TCI state indication 512 and the determined spatial filter 516. The transmission of the non-dedicated UL channel/RS may be performed, e.g., by the non-dedicated channel and signal process component 1144 and/or the transmission component 1134 of the apparatus 1102 in FIG. 11.

Figure 11:
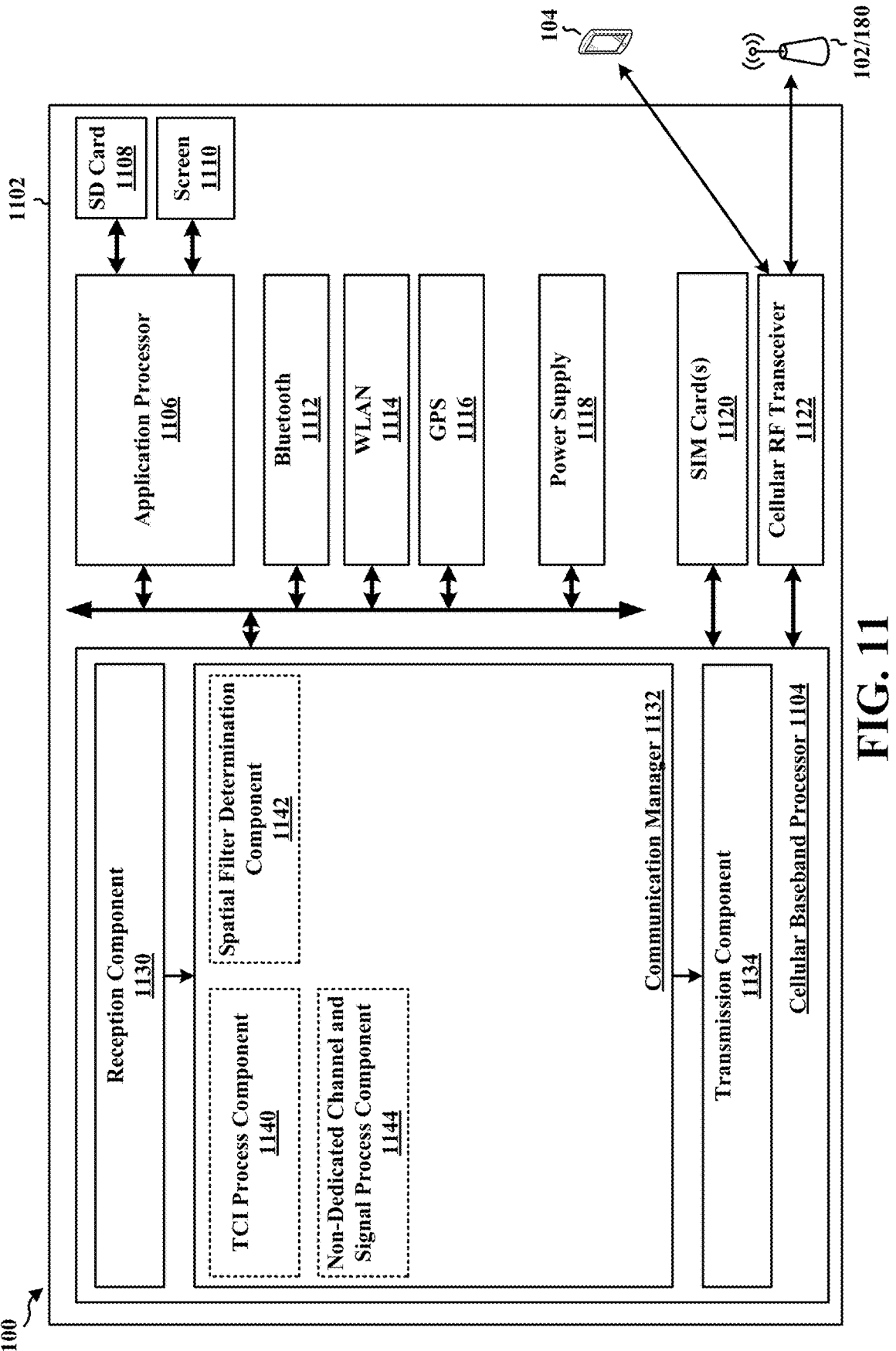
FIG. 11 is a diagram illustrating an example of a hardware implementation for an example apparatus in accordance with aspects presented herein.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a TCI process component 1140 that is configured to receive a TCI state indication in association with a communication of at least one non-dedicated UL channel or non-dedicated UL signal, e.g., as described in connection with 1002 of FIG. 10. The communication manager 1132 further includes a QCL spatial filter determination component 1142 that is configured to determine a spatial filter for the communication of the at least one non-dedicated UL channel or the non-dedicated UL signal based on one or more source reference signals for the received TCI state indication, e.g., as described in connection with 1004 of FIG. 10. The communication manager 1132 further includes a non-dedicated channel and signal process component 1144 that is configured to may transmit the at least one non-dedicated UL channel or the non-dedicated UL signal based on the received TCI state indication and the determined spatial filter, e.g., as described in connection with 1006 of FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving a TCI state indication in association with a communication of at least one non-dedicated UL channel or non-dedicated UL signal (e.g., the TCI process component 1140 and/or the reception component 1130). The apparatus 1102 includes means for determining a spatial filter for the communication of the at least one non-dedicated UL channel or the non-dedicated UL signal based on one or more source reference signals for the received TCI state indication (e.g., the spatial filter determination component 1142). The apparatus 1102 includes means for transmitting the at least one non-dedicated UL channel or the non-dedicated UL signal based on the received TCI state indication and the determined spatial filter (e.g., the non-dedicated channel and signal process component 1144 and/or the transmission component 1134).

In one configuration, the TCI state indication may be a unified TCI state indication, and the unified TCI state indication may include at least one of a joint DL or UL common TCI state indicating a common beam for at least one DL channel or DL RS and at least one UL channel or UL RS, or a separate UL common TCI state indicating a common beam for at least two UL channels or UL RSs.

In another configuration, the at least one of the non-dedicated UL channel or the non-dedicated UL signal may include a broadcast channel or broadcast signal, a multicast channel or multicast signal, or a groupcast channel or groupcast signal. In such a configuration, the broadcast channel or broadcast signal may include at least one of a PUCCH associated with CORESET zero, a PUCCH associated with CORESET including SS zero, or a PUCCH associated with CORESETs including CSS. The broadcast channel or broadcast signal may include at least one of a PUSCH with a common configuration in a serving base station or a PUCCH with a common configuration in a serving base station. The broadcast channel or broadcast signal may include a physical random access channel preamble. The multicast channel or multicast signal may include at least one of a multicast PUCCH or a multicast PUSCH. The groupcast channel or groupcast signal may include at least one of a groupcast PUCCH or a groupcast PUSCH.

In another configuration, the TCI state indication may be received via one of RRC signaling or a MAC-CE. In such a configuration, the received RRC signaling or the MAC-CE may be associated with one TCI state indication, the one TCI state indication being the received TCI state indication. In such a configuration, the received RRC signaling or the MAC-CE may be associated with one channel type, the at least one non-dedicated channel or the non-dedicated signal being the one channel type. In such a configuration, the received RRC signaling or the MAC-CE may be associated with one TCI state indication and one channel type, the one TCI state indication being the received TCI state indication, the at least one non-dedicated channel or the non-dedicated signal being the one channel type.

In another configuration, the TCI state indication may indicate non-serving cell information, or the TCI state indication may not indicate non-serving cell information.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 12 is a flowchart 1200 of a method of wireless communication. The method may be performed by a base station or a component of a base station (e.g., the base station 102, 180, 310, 502; the apparatus 1302; a processing system, which may include the memory 376 and which may be the entire base station 310 or a component of the base station 310, such as the TX processor 316 the RX processor 370, and/or the controller/processor 375). Optional aspects are illustrated with a dashed line. The method may enable the base station to transmit unified TCI state indication for non-dedicated channel.

At 1202, the base station may transmit a TCI state indication in association with a communication of at least one non-dedicated UL channel or non-dedicated UL signal, such as described in connection with FIG. 5. For example, at 510, the base station 502 may transmit unified TCI state indication 512 to one or more UEs that is in association with a communication of at least one non-dedicated UL channel/signal 520. The transmission of the TCI state indication may be performed, e.g., by the TCI configuration component 1340 and/or the transmission component 1334 of the apparatus 1302 in FIG. 13.

In one example, the TCI state indication may be a unified TCI state indication, and the unified TCI state indication may include at least one of a joint DL or UL common TCI state indicating a common beam for at least one DL channel or DL RS and at least one UL channel or UL RS, or a separate UL common TCI state indicating a common beam for at least two UL channels or UL RSs.

In another example, the at least one of the non-dedicated UL channel or the non-dedicated UL signal may include a broadcast channel or broadcast signal, a multicast channel or multicast signal, or a groupcast channel or groupcast signal. In such an example, the broadcast channel or broadcast signal may include at least one of a PUCCH associated with CORESET zero, a PUCCH associated with CORESET including SS zero, or a PUCCH associated with CORESETs including CSS. The broadcast channel or broadcast signal may include at least one of a PUSCH with a common configuration in a serving base station or a PUCCH with a common configuration in a serving base station. The broadcast channel or broadcast signal may include a physical random access channel preamble. The multicast channel or multicast signal may include at least one of a multicast PUCCH or a multicast PUSCH. The groupcast channel or groupcast signal may include at least one of a groupcast PUCCH or a groupcast PUSCH.

In another example, the TCI state indication may be transmitted via one of RRC signaling or a MAC-CE. In such an example, the transmitted RRC signaling or the MAC-CE may be associated with one TCI state indication, the one TCI state indication being the received TCI state indication. In such an example, the transmitted RRC signaling or the MAC-CE may be associated with one channel type, the at least one non-dedicated channel or the non-dedicated signal being the one channel type. In such an example, the transmitted RRC signaling or the MAC-CE may be associated with one TCI state indication and one channel type, the one TCI state indication being the received TCI state indication, the at least one non-dedicated channel or the non-dedicated signal being the one channel type.

In another example, the TCI state indication may indicate non-serving cell information, or the TCI state indication may not indicate non-serving cell information.

At 1204, the base station may receive the at least one non-dedicated UL channel or the non-dedicated UL signal based on the transmitted TCI state indication and a spatial filter associated with one or more source reference signals of the transmitted TCI state indication, such as described in connection with FIG. 5. For example, at 522, the base station 502 may receive the non-dedicated UL channel/signal 520 from the UE 504 based on the transmitted TCI state indication 512 and a spatial filter 516 associated with one or more source reference signals of the transmitted TCI state indication 512. The reception of the non-dedicated UL channel or the non-dedicated UL signal may be performed, e.g., by the non-dedicated channel/RS reception component 1342 and/or the reception component 1330 of the apparatus 1302 in FIG. 13.

Figure 13:
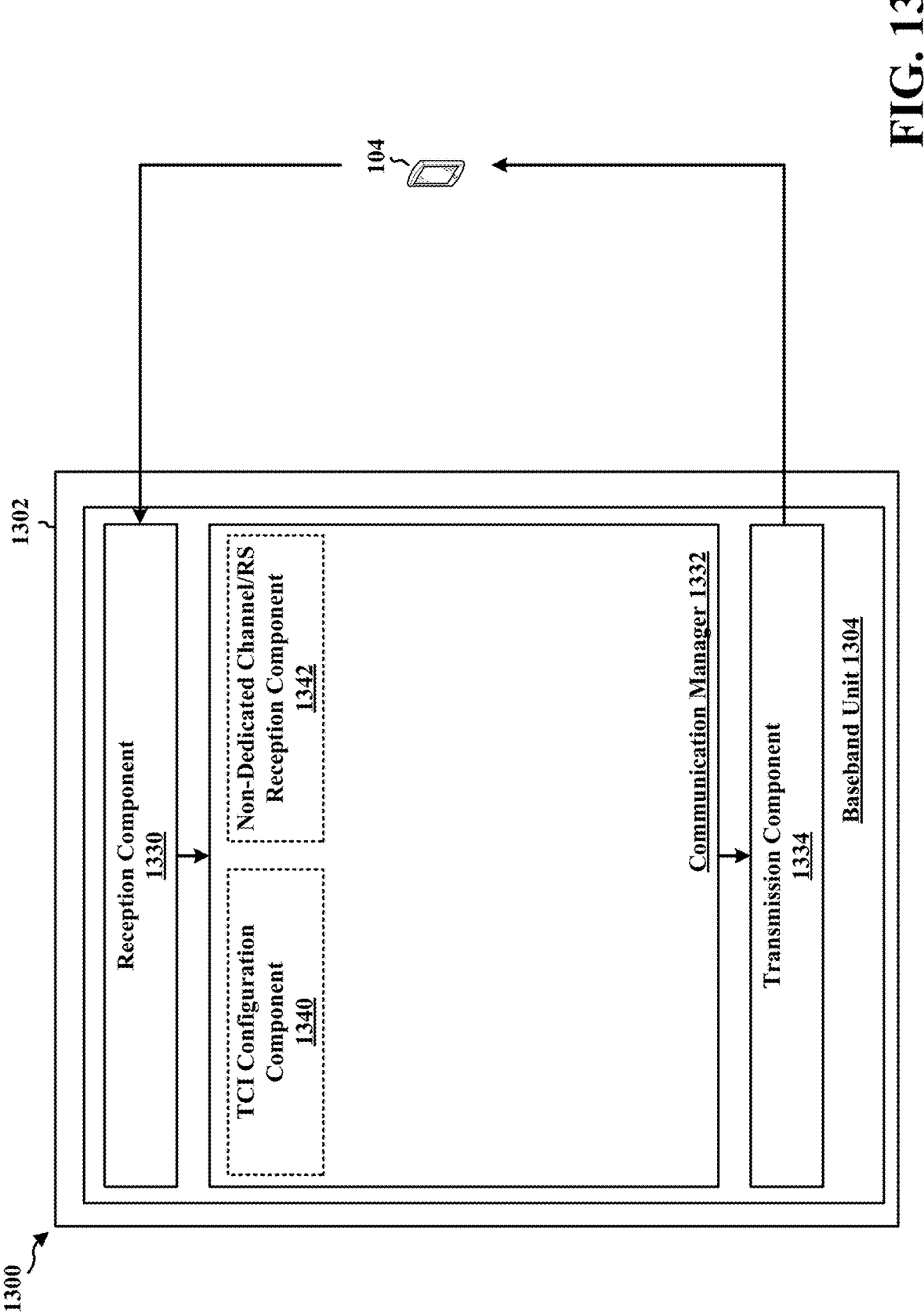
FIG. 13 is a diagram illustrating an example of a hardware implementation for an example apparatus in accordance with aspects presented herein.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes a TCI configuration component 1340 that is configured to transmit a TCI state indication in association with a communication of at least one non-dedicated UL channel or non-dedicated UL signal, e.g., as described in connection with 1202 of FIG. 12. The communication manager 1332 further includes a non-dedicated channel/RS reception component 1342 that is configured to receive the at least one non-dedicated UL channel or the non-dedicated UL signal based on the transmitted TCI state indication and a spatial filter associated with one or more source reference signals of the transmitted TCI state indication, e.g., as described in connection with 1204 of FIG. 12.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for transmitting a TCI state indication in association with a communication of at least one non-dedicated UL channel or non-dedicated UL signal (e.g., the TCI configuration component 1340 and/or the transmission component 1334). The apparatus 1302 includes means for receiving the at least one non-dedicated UL channel or the non-dedicated UL signal based on the transmitted TCI state indication and a spatial filter associated with one or more source reference signals of the transmitted TCI state indication (e.g., the non-dedicated channel/RS reception component 1342 and/or the reception component 1330).

In one configuration, the TCI state indication may be a unified TCI state indication, and the unified TCI state indication may include at least one of a joint DL or UL common TCI state indicating a common beam for at least one DL channel or DL RS and at least one UL channel or UL RS, or a separate UL common TCI state indicating a common beam for at least two UL channels or UL RSs.

In another configuration, the at least one of the non-dedicated UL channel or the non-dedicated UL signal may include a broadcast channel or broadcast signal, a multicast channel or multicast signal, or a groupcast channel or groupcast signal. In such a configuration, the broadcast channel or broadcast signal may include at least one of a PUCCH associated with CORESET zero, a PUCCH associated with CORESET including SS zero, or a PUCCH associated with CORESETs including CSS. The broadcast channel or broadcast signal may include at least one of a PUSCH with a common configuration in a serving base station or a PUCCH with a common configuration in a serving base station. The broadcast channel or broadcast signal may include a physical random access channel preamble. The multicast channel or multicast signal may include at least one of a multicast PUCCH or a multicast PUSCH. The groupcast channel or groupcast signal may include at least one of a groupcast PUCCH or a groupcast PUSCH.

In another configuration, the TCI state indication may be transmitted via one of RRC signaling or a MAC-CE. In such a configuration, the transmitted RRC signaling or the MAC-CE may be associated with one TCI state indication, the one TCI state indication being the received TCI state indication. In such a configuration, the transmitted RRC signaling or the MAC-CE may be associated with one channel type, the at least one non-dedicated channel or the non-dedicated signal being the one channel type. In such a configuration, the transmitted RRC signaling or the MAC-CE may be associated with one TCI state indication and one channel type, the one TCI state indication being the received TCI state indication, the at least one non-dedicated channel or the non-dedicated signal being the one channel type.

In another configuration, the TCI state indication may indicate non-serving cell information, or the TCI state indication may not indicate non-serving cell information.

The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples set forth additional aspects and are illustrative only and aspects thereof may be combined with aspects of other embodiments or teaching described herein, without limitation.

Aspect 1 is method of wireless communication of a UE, comprising: receiving a TCI state indication in association with a communication of at least one non-dedicated DL channel or non-dedicated DL signal; determining QCL information for the communication of the at least one non-dedicated DL channel or the non-dedicated DL signal based on one or more source reference signals for the received TCI state indication; and receiving the at least one non-dedicated DL channel or the non-dedicated DL signal based on the received TCI state indication and the determined QCL information.

In aspect 2, the method of aspect 1 further includes that the TCI state indication is a unified TCI state indication.

In aspect 3, the method of aspect 1 or aspect 2 further includes that the unified TCI state indication includes at least one of a joint DL or UL common TCI state indicating a common beam for at least one DL channel or DL RS and at least one UL channel or UL RS, or a separate DL common TCI state indicating a common beam for at least two DL channels or DL RSs.

In aspect 4, the method of any of aspects 1-3 further includes that the at least one of the non-dedicated DL channel or the non-dedicated DL signal comprises a broadcast channel or broadcast signal, a multicast channel or multicast signal, or a groupcast channel or groupcast signal.

In aspect 5, the method of any of aspects 1-4 further includes that the broadcast channel or broadcast signal comprises at least one of a broadcast PDCCH associated with CORESET zero, a PDCCH associated with CORESET including SS zero, a PDCCH associated with CORESETs including CSS, a PDSCH associated with CORESET zero, a PDSCH associated with CORESET including SS zero, or a PDSCH associated with CORESETs including CSS.

In aspect 6, the method of any of aspects 1-5 further includes that the broadcast channel or broadcast signal comprises a PDSCH with a common configuration in a serving base station.

In aspect 7, the method of any of aspects 1-6 further includes that the multicast channel or multicast signal comprises at least one of a multicast PDCCH or a multicast PDSCH.

In aspect 8, the method of any of aspects 1-7 further includes that the groupcast channel or groupcast signal comprises at least one of a groupcast PDCCH or a groupcast PDSCH.

In aspect 9, the method of any of aspects 1-8 further includes that the TCI state indication is received via one of RRC signaling or a MAC-CE.

In aspect 10, the method of any of aspects 1-9 further includes that the received RRC signaling or the MAC-CE is associated with one TCI state indication, the one TCI state indication being the received TCI state indication.

In aspect 11, the method of any of aspects 1-10 further includes that the received RRC signaling or the MAC-CE is associated with one channel type, the at least one non-dedicated channel or the non-dedicated signal being the one channel type.

In aspect 12, the method of any of aspects 1-11 further includes that the received RRC signaling or the MAC-CE is associated with one TCI state indication and one channel type, the one TCI state indication being the received TCI state indication, the at least one non-dedicated channel or the non-dedicated signal being the one channel type.

In aspect 13, the method of any of aspects 1-12 further includes that the TCI state indication indicates non-serving cell information.

In aspect 14, the method of any of aspects 1-13 further includes that the TCI state indication does not indicate non-serving cell information.

Aspect 15 is an apparatus for wireless communication including at least one processor coupled to a memory and configured to implement a method as in any of aspects 1 to 14.

Aspect 16 is an apparatus for wireless communication including means for implementing a method as in any of aspects 1 to 14.

Aspect 17 is a non-transitory computer-readable medium storing computer executable code, where the code when executed by a processor causes the processor to implement a method as in any of aspects 1 to 14.

Aspect 18 is a method of wireless communication of a base station, comprising: transmitting a TCI state indication in association with a communication of at least one non-dedicated DL channel or non-dedicated DL signal; and transmitting the at least one non-dedicated DL channel or the non-dedicated DL signal based on the transmitted TCI state indication and QCL information associated with one or more source reference signals of the transmitted TCI state indication.

In aspect 19, the method of aspect 18 further includes that the TCI state indication is a unified TCI state indication.

In aspect 20, the method of aspect 18 or aspect 19 further includes that the unified TCI state indication includes at least one of a joint DL or UL common TCI state indicating a common beam for at least one DL channel or DL RS and at least one UL channel or UL RS, or a separate DL common TCI state indicating a common beam for at least two DL channels or DL RSs.

In aspect 21, the method of any of aspects 18-20 further includes that the at least one of the non-dedicated DL channel or the non-dedicated DL signal comprises a broadcast channel or broadcast signal, a multicast channel or multicast signal, or a groupcast channel or groupcast signal.

In aspect 22, the method of any of aspects 18-21 further includes that the broadcast channel or broadcast signal comprises at least one of a broadcast PDCCH associated with CORESET zero, a PDCCH associated with CORESET including SS zero, a PDCCH associated with CORESETs including CSS, a PDSCH associated with CORESET zero, a PDSCH associated with CORESET including SS zero, or a PDSCH associated with CORESETs including CSS.

In aspect 23, the method of any of aspects 18-22 further includes that the broadcast channel or broadcast signal comprises a PDSCH with a common configuration in a serving base station.

In aspect 24, the method of any of aspects 18-23 further includes that the multicast channel or multicast signal comprises at least one of a multicast PDCCH or a multicast PDSCH.

In aspect 25, the method of any of aspects 18-24 further includes that the groupcast channel or groupcast signal comprises at least one of a groupcast PDCCH or a groupcast PDSCH.

In aspect 26, the method of any of aspects 18-25 further includes that the TCI state indication is transmitted via one of RRC signaling or a MAC-CE.

In aspect 27, the method of any of aspects 18-26 further includes that the transmitted RRC signaling or the MAC-CE is associated with one TCI state indication, the one TCI state indication being the transmitted TCI state indication.

In aspect 28, the method of any of aspects 18-27 further includes that the transmitted RRC signaling or the MAC-CE is associated with one channel type, the at least one non-dedicated channel or the non-dedicated signal being the one channel type.

In aspect 29, the method of any of aspects 18-28 further includes that the transmitted RRC signaling or the MAC-CE is associated with one TCI state indication and one channel type, the one TCI state indication being the transmitted TCI state indication, the at least one non-dedicated channel or the non-dedicated signal being the one channel type.

In aspect 30, the method of any of aspects 18-29 further includes that the TCI state indication indicates non-serving cell information.

In aspect 31, the method of any of aspects 18-30 further includes that the TCI state indication does not indicate non-serving cell information.

Aspect 32 is an apparatus for wireless communication including at least one processor coupled to a memory and configured to implement a method as in any of aspects 18 to 31.

Aspect 33 is an apparatus for wireless communication including means for implementing a method as in any of aspects 18 to 31.

Aspect 34 is a non-transitory computer-readable medium storing computer executable code, where the code when executed by a processor causes the processor to implement a method as in any of aspects 18 to 31.

Aspect 35 is a method of wireless communication of a UE, comprising: receiving a TCI state indication in association with a communication of at least one non-dedicated UL channel or non-dedicated UL signal; determining a spatial filter for the communication of the at least one non-dedicated UL channel or the non-dedicated UL signal based on one or more source reference signals for the received TCI state indication; and transmitting the at least one non-dedicated UL channel or the non-dedicated UL signal based on the received TCI state indication and the determined spatial filter.

In aspect 36, the method of aspect 35 further includes that the TCI state indication is a unified TCI state indication.

In aspect 37, the method of aspect 35 or aspect 36 further includes that the unified TCI state indication includes at least one of a joint DL or UL common TCI state indicating a common beam for at least one DL channel or DL RS and at least one UL channel or UL RS, or a separate UL common TCI state indicating a common beam for at least two UL channels or UL RSs.

In aspect 38, the method of any of aspects 35-37 further includes that the at least one of the non-dedicated UL channel or the non-dedicated UL signal comprises a broadcast channel or broadcast signal, a multicast channel or multicast signal, or a groupcast channel or groupcast signal.

In aspect 39, the method of any of aspects 35-38 further includes that the broadcast channel or broadcast signal comprises at least one of a PUCCH associated with CORESET zero, a PUCCH associated with CORESET including SS zero, or a PUCCH associated with CORESETs including CSS.

In aspect 40, the method of any of aspects 35-39 further includes that the broadcast channel or broadcast signal comprises at least one of a PUSCH with a common configuration in a serving base station or a PUCCH with a common configuration in a serving base station.

In aspect 41, the method of any of aspects 35-40 further includes that the broadcast channel or broadcast signal comprises a physical random access channel preamble.

In aspect 42, the method of any of aspects 35-41 further includes that the multicast channel or multicast signal comprises at least one of a multicast PUCCH or a multicast PUSCH.

In aspect 43, the method of any of aspects 35-42 further includes that the groupcast channel or groupcast signal comprises at least one of a groupcast PUCCH or a groupcast PUSCH.

In aspect 44, the method of any of aspects 35-43 further includes that the TCI state indication is received via one of RRC signaling or a MAC-CE.

In aspect 45, the method of any of aspects 35-44 further includes that the received RRC signaling or the MAC-CE is associated with one TCI state indication, the one TCI state indication being the received TCI state indication.

In aspect 46, the method of any of aspects 35-45 further includes that the received RRC signaling or the MAC-CE is associated with one channel type, the at least one non-dedicated channel or the non-dedicated signal being the one channel type.

In aspect 47, the method of any of aspects 35-46 further includes that the received RRC signaling or the MAC-CE is associated with one TCI state indication and one channel type, the one TCI state indication being the received TCI state indication, the at least one non-dedicated channel or the non-dedicated signal being the one channel type.

In aspect 48, the method of any of aspects 35-47 further includes that the TCI state indication indicates non-serving cell information.

In aspect 49, the method of any of aspects 35-48 further includes that the TCI state indication does not indicate non-serving cell information.

Aspect 50 is an apparatus for wireless communication including at least one processor coupled to a memory and configured to implement a method as in any of aspects 35 to 49.

Aspect 51 is an apparatus for wireless communication including means for implementing a method as in any of aspects 35 to 49.

Aspect 52 is anon-transitory computer-readable medium storing computer executable code, where the code when executed by a processor causes the processor to implement a method as in any of aspects 35 to 49.

Aspect 53 is a method of wireless communication of a base station, comprising: transmitting a TCI state indication in association with a communication of at least one non-dedicated UL channel or non-dedicated UL signal; and receiving the at least one non-dedicated UL channel or the non-dedicated UL signal based on the transmitted TCI state indication and a spatial filter associated with one or more source reference signals of the transmitted TCI state indication.

In aspect 54, the method of aspect 53 further includes that the TCI state indication is a unified TCI state indication.

In aspect 55, the method of aspect 53 or aspect 54 further includes that the unified TCI state indication includes at least one of a joint DL or UL common TCI state indicating a common beam for at least one DL channel or DL RS and at least one UL channel or UL RS, or a separate UL common TCI state indicating a common beam for at least two UL channels or UL RSs.

In aspect 56, the method of any of aspects 53-55 further includes that the at least one of the non-dedicated UL channel or the non-dedicated UL signal comprises a broadcast channel or broadcast signal, a multicast channel or multicast signal, or a groupcast channel or groupcast signal.

In aspect 57, the method of any of aspects 53-56 further includes that the broadcast channel or broadcast signal comprises at least one of a PUCCH associated with CORESET zero, a PUCCH associated with CORESET including SS zero, or a PUCCH associated with CORESETs including CSS.

In aspect 58, the method of any of aspects 53-57 further includes that the broadcast channel or broadcast signal comprises at least one of a PUSCH with a common configuration in a serving base station or a PUCCH with a common configuration in a serving base station.

In aspect 59, the method of any of aspects 53-58 further includes that the broadcast channel or broadcast signal comprises a physical random access channel preamble.

In aspect 60, the method of any of aspects 53-59 further includes that the multicast channel or multicast signal comprises at least one of a multicast PUCCH or a multicast PUSCH.

In aspect 61, the method of any of aspects 53-60 further includes that the groupcast channel or groupcast signal comprises at least one of a groupcast PUCCH or a groupcast PUSCH.

In aspect 62, the method of any of aspects 53-61 further includes that the TCI state indication is transmitted via one of RRC signaling or a MAC-CE.

In aspect 63, the method of any of aspects 53-62 further includes that the transmitted RRC signaling or the MAC-CE is associated with one TCI state indication, the one TCI state indication being the transmitted TCI state indication.

In aspect 64, the method of any of aspects 53-63 further includes that the transmitted RRC signaling or the MAC-CE is associated with one channel type, the at least one non-dedicated channel or the non-dedicated signal being the one channel type.

In aspect 65, the method of any of aspects 53-64 further includes that the transmitted RRC signaling or the MAC-CE is associated with one TCI state indication and one channel type, the one TCI state indication being the transmitted TCI state indication, the at least one non-dedicated channel or the non-dedicated signal being the one channel type.

In aspect 66, the method of any of aspects 53-65 further includes that the TCI state indication indicates non-serving cell information.

In aspect 67, the method of any of aspects 53-66 further includes that the TCI state indication does not indicate non-serving cell information.

Aspect 68 is an apparatus for wireless communication including at least one processor coupled to a memory and configured to implement a method as in any of aspects 53 to 67.

Aspect 69 is an apparatus for wireless communication including means for implementing a method as in any of aspects 53 to 67.

Aspect 70 is anon-transitory computer-readable medium storing computer executable code, where the code when executed by a processor causes the processor to implement a method as in any of aspects 53 to 67.

Aspect 71 is a method of wireless communication of a UE, comprising: receiving a TCI state indication in association with a communication of at least one non-dedicated channel or non-dedicated signal; and refraining from applying at least one of QCL information or a spatial filter for the communication of the at least one non-dedicated channel or the non-dedicated signal based on one or more source reference signals for the received TCI state indication.

In aspect 72, the method of aspect 71 further includes that the TCI state indication is a unified TCI state indication.

Aspect 73 is an apparatus for wireless communication including at least one processor coupled to a memory and configured to implement a method as in any of aspects 71 to 72.

Aspect 74 is an apparatus for wireless communication including means for implementing a method as in any of aspects 71 to 72.

Aspect 75 is anon-transitory computer-readable medium storing computer executable code, where the code when executed by a processor causes the processor to implement a method as in any of aspects 71 to 72.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that"rather than imply an immediate temporal relationship or reaction. That is, these phrases, e. g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism", "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:

at least one memory; and at least one processor coupled to the at least one memory and configured to:

receive a transmission configuration indication (TCI) state indication in association with a communication of at least one non-dedicated downlink (DL) channel or non-dedicated DL signal, wherein the at least one of the non-dedicated DL channel or the non-dedicated DL signal comprises a broadcast channel or broadcast signal that includes at least one of a broadcast physical downlink control channel (PDCCH) associated with control resource set (CORESET) zero, a PDCCH associated with CORESET including search space (SS) zero, a PDCCH associated with CORESETs including common SS (CSS), a physical downlink shared channel (PDSCH) associated with CORESET zero, a PDSCH associated with CORESET including SS zero, or a PDSCH associated with CORESETs including CSS;

determine quasi co-location (QCL) information for the communication of the at least one non-dedicated DL channel or the non-dedicated DL signal based on one or more source reference signals for the received TCI state indication; and receive the at least one non-dedicated DL channel or the non-dedicated DL signal based on the received TCI state indication and the determined QCL information.

2. The apparatus of claim 1, wherein the TCI state indication is a unified TCI state indication.

3. The apparatus of claim 2, wherein the unified TCI state indication includes at least one of a joint DL or uplink (UL) common TCI state indicating a common beam for at least one DL channel or DL reference signal (RS) and at least one UL channel or UL RS, or a separate DL common TCI state indicating a common beam for at least two DL channels or DL RSs.

4. The apparatus of claim 1, wherein the broadcast channel or broadcast signal comprises a PDSCH with a common configuration in a serving base station.

5. The apparatus of claim 1, wherein the TCI state indication is received via one of radio resource control (RRC) signaling or a medium access control (MAC) control element (CE) (MAC-CE).

6. The apparatus of claim 5, wherein the received RRC signaling or the MAC-CE is associated with one TCI state indication, the one TCI state indication being the received TCI state indication.

7. The apparatus of claim 5, wherein the received RRC signaling or the MAC-CE is associated with one channel type, the at least one non-dedicated channel or the non-dedicated signal being the one channel type.

8. The apparatus of claim 5, wherein the received RRC signaling or the MAC-CE is associated with one TCI state indication and one channel type, the one TCI state indication being the received TCI state indication, the at least one non-dedicated channel or the non-dedicated signal being the one channel type.

9. The apparatus of claim 1, wherein the TCI state indication indicates non-serving cell information.

10. The apparatus of claim 1, wherein the TCI state indication does not indicate non-serving cell information.

11. A method of wireless communication at a user equipment (UE), comprising:
receiving a transmission configuration indication (TCI) state indication in association with a communication of at least one non-dedicated downlink (DL) channel or non-dedicated DL signal, wherein the at least one of the non-dedicated DL channel or the non-dedicated DL signal comprises a broadcast channel or broadcast signal that includes at least one of a broadcast physical downlink control channel (PDCCH) associated with control resource set (CORESET) zero, a PDCCH associated with CORESET including search space (SS) zero, a PDCCH associated with CORESETs including common SS (CSS), a physical downlink shared channel (PDSCH) associated with CORESET zero, a PDSCH associated with CORESET including SS zero, or a PDSCH associated with CORESETs including CSS;
determining quasi co-location (QCL) information for the communication of the at least one non-dedicated DL channel or the non-dedicated DL signal based on one or more source reference signals for the received TCI state indication; and
receiving the at least one non-dedicated DL channel or the non-dedicated DL signal based on the received TCI state indication and the determined QCL information.

12. An apparatus for wireless communication at a base station, comprising:
at least one memory; and
at least one processor coupled to the at least one memory and configured to:
transmit a transmission configuration indication (TCI) state indication in association with a communication of at least one non-dedicated downlink (DL) channel or non-dedicated DL signal, wherein the at least one of the non-dedicated DL channel or the non-dedicated DL signal comprises a broadcast channel or broadcast signal that includes at least one of a broadcast physical downlink control channel (PDCCH) associated with control resource set (CORESET) zero, a PDCCH associated with CORESET including search space (SS) zero, a PDCCH associated with CORESETs including common SS (CSS), a physical downlink shared channel (PDSCH) associated with CORESET zero, a PDSCH associated with CORESET including SS zero, or a PDSCH associated with CORESETs including CSS; and
transmit the at least one non-dedicated DL channel or the non-dedicated DL signal based on the transmitted TCI state indication and quasi co-location (QCL) information associated with one or more source reference signals of the transmitted TCI state indication.

13. The apparatus of claim 12, wherein the TCI state indication is a unified TCI state indication.

14. The apparatus of claim 13, wherein the unified TCI state indication includes at least one of a joint DL or uplink (UL) common TCI state indicating a common beam for at least one DL channel or DL reference signal (RS) and at least one UL channel or UL RS, or a separate DL common TCI state indicating a common beam for at least two DL channels or DL RSs.

15. A method of wireless communication at a user equipment comprising:
receiving a transmission configuration indication (TCI) state in association with a communication of at least one non-dedicated uplink (UL) channel or non-dedicated UL signal, wherein the at least one of the non-dedicated UL channel or the non-dedicated UL signal comprises a broadcast channel or broadcast signal that includes at least one of a physical uplink control channel (PUCCH) associated with control resource set (CORESET) zero, a PUCCH associated with CORESET including search space (SS) zero, or a PUCCH associated with CORESETs including common SS (CSS);
determining a spatial filter for the communication of the at least one non-dedicated UL channel or the non-dedicated UL signal based on one or more source reference signals for the received TCI state indication; and
transmitting the at least one non-dedicated UL channel or the non-dedicated UL signal based on the received TCI state indication and the determined spatial filter.

16. An apparatus for wireless communication at a user equipment (UE), comprising:
at least one memory; and
at least one processor coupled to the at least one memory and configured to:
receive a transmission configuration indication (TCI) state in association with a communication of at least one non-dedicated uplink (UL) channel or non-dedicated UL signal, wherein the at least one of the non-dedicated UL channel or the non-dedicated UL signal comprises a broadcast channel or broadcast signal that includes at least one of a physical uplink control channel (PUCCH) associated with control resource set (CORESET) zero, a PUCCH associated with CORESET including search space (SS) zero, or a PUCCH associated with CORESETs including common SS (CSS);
determine a spatial filter for the communication of the at least one non-dedicated UL channel or the non-dedicated UL signal based on one or more source reference signals for the received TCI state indication; and transmit the at least one non-dedicated UL channel or the non-dedicated UL signal based on the received TCI state indication and the determined spatial filter.

17. The apparatus of claim 16, wherein the TCI state indication is a unified TCI state indication.

18. The apparatus of claim 17, wherein the unified TCI state indication includes at least one of a joint downlink (DL) or UL common TCI state indicating a common beam for at least one DL channel or DL reference signal (RS) and at least one UL channel or UL RS, or a separate UL common TCI state indicating a common beam for at least two UL channels or UL RSs.

19. The apparatus of claim 16, wherein the broadcast channel or broadcast signal comprises at least one of a physical uplink shared channel (PUSCH) with a common configuration in a serving base station or a PUCCH with a common configuration in a serving base station.

20. The apparatus of claim 16, wherein the broadcast channel or broadcast signal comprises a physical random access channel preamble.

21. The apparatus of claim 16, wherein the TCI state indication is received via one of radio resource control (RRC) signaling or a medium access control (MAC) control element (CE) (MAC-CE).

22. The apparatus of claim 21, wherein the received RRC signaling or the MAC-CE is associated with one TCI state indication, the one TCI state indication being the received TCI state indication.

23. The apparatus of claim 21, wherein the received RRC signaling or the MAC-CE is associated with one channel type, the at least one non-dedicated channel or the non-dedicated signal being the one channel type.

24. The apparatus of claim 21, wherein the received RRC signaling or the MAC-CE is associated with one TCI state indication and one channel type, the one TCI state indication being the received TCI state indication, the at least one non-dedicated channel or the non-dedicated signal being the one channel type.

25. The apparatus of claim 16, wherein the TCI state indication indicates non-serving cell information.

26. The apparatus of claim 16, wherein the TCI state indication does not indicate non-serving cell information.

* * * * *